(12) United States Patent
McCarthy

(10) Patent No.: US 10,277,906 B2
(45) Date of Patent: Apr. 30, 2019

(54) SYSTEM AND METHOD FOR SELECTIVELY COMPRESSING IMAGES

(71) Applicant: ARRIS Enterprises, Inc., Suwanee, GA (US)

(72) Inventor: Sean T. McCarthy, San Francisco, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 288 days.

(21) Appl. No.: 15/079,012

(22) Filed: Mar. 23, 2016

(65) Prior Publication Data

US 2017/0155913 A1  Jun. 1, 2017

Related U.S. Application Data

(60) Provisional application No. 62/136,858, filed on Mar. 23, 2015.

(51) Int. Cl.
*H04N 19/172* (2014.01)
*H04N 19/115* (2014.01)
*H04N 19/60* (2014.01)
*H04N 19/132* (2014.01)
*H04N 19/14* (2014.01)
(Continued)

(52) U.S. Cl.
CPC ......... *H04N 19/172* (2014.11); *H04N 19/115* (2014.11); *H04N 19/132* (2014.11); *H04N 19/14* (2014.11); *H04N 19/60* (2014.11); *H04N 19/15* (2014.11); *H04N 19/36* (2014.11); *H04N 19/46* (2014.11)

(58) Field of Classification Search
CPC .... H04N 19/115; H04N 19/14; H04N 19/172; H04N 19/36
See application file for complete search history.

(56) References Cited

U.S. PATENT DOCUMENTS 4,577,235 A * 3/1986 Kannapell .......... H04N 1/40062
358/462
5,091,967 A * 2/1992 Ohsawa ................. G06T 7/194
348/26
(Continued)

FOREIGN PATENT DOCUMENTS

EP         2486732 A2   8/2012
WO    2006/110046 A1   10/2006

OTHER PUBLICATIONS

PCT Search Report & Written Opinion, RE: Application No. PCT/US2016/023851, dated Aug. 11, 2016.
(Continued)

*Primary Examiner* — Peter D Le
(74) *Attorney, Agent, or Firm* — Thomas A. Ward

(57) ABSTRACT

A system and method for characterizing the sensitivity of image data to compression. After a video signal is transformed to the frequency domain, statistical data regarding a video signal or frame of a video signal can be calculated. In one alternate, a contour map of the original signal can be calculated and the parameters of the contour map can be recorded. The same signal can be compressed and then upscaled and a second contour map can be calculated and the parameters of the second contour map can be recorded. Based on the difference between the first and second contour maps, a sensitivity of the video to compression can be determined.

7 Claims, 32 Drawing Sheets

(51) Int. Cl.
*H04N 19/46* (2014.01)
*H04N 19/15* (2014.01)
*H04N 19/36* (2014.01)

(56) References Cited

U.S. PATENT DOCUMENTS

| | | | | |
|---|---|---|---|---|
| 5,257,116 A * | 10/1993 | Suzuki | H04N 1/4055 | 358/444 |
| 5,267,146 A * | 11/1993 | Shimizu | G06F 17/5095 | 703/1 |
| 5,556,764 A * | 9/1996 | Sizto | G01N 15/1468 | 382/133 |
| 5,594,327 A * | 1/1997 | Sagredos | G01N 27/06 | 324/439 |
| 5,974,175 A * | 10/1999 | Suzuki | G06K 9/48 | 382/103 |
| 6,336,082 B1 * | 1/2002 | Nguyen | G06K 9/6255 | 340/658 |
| 6,393,160 B1 * | 5/2002 | Edgar | G06T 5/50 | 348/E5.049 |
| 6,661,925 B1 * | 12/2003 | Pianykh | H04N 19/63 | 375/240.11 |
| 6,661,926 B1 * | 12/2003 | Thoreau | H04N 19/176 | 375/E7.137 |
| 6,721,003 B1 * | 4/2004 | Tsuruoka | G06T 3/4015 | 348/208.6 |
| 6,912,322 B2 * | 6/2005 | Smith | G06T 5/50 | 382/275 |
| 7,944,971 B1 * | 5/2011 | Pun | H04N 19/176 | 348/412.1 |
| 8,995,793 B1 * | 3/2015 | Laflen | G06T 7/40 | 382/299 |
| 2004/0042664 A1 * | 3/2004 | Van Hall | G06K 9/6828 | 382/224 |
| 2004/0086042 A1 * | 5/2004 | Kim | H04N 19/176 | 375/240.08 |
| 2007/0013866 A1 * | 1/2007 | Sugita | G06K 9/00597 | 351/205 |
| 2008/0304759 A1 * | 12/2008 | Lee | H04N 19/105 | 382/238 |
| 2009/0075590 A1 * | 3/2009 | Sahinoglu | G01S 5/0221 | 455/39 |
| 2010/0104202 A1 * | 4/2010 | Chen | H04N 5/21 | 382/218 |
| 2010/0106426 A1 * | 4/2010 | Hunt | G06K 9/3233 | 702/19 |
| 2010/0260433 A1 * | 10/2010 | Zhang | G06T 3/403 | 382/264 |
| 2011/0142352 A1 * | 6/2011 | Lee | G06K 9/3275 | 382/199 |
| 2012/0321194 A1 * | 12/2012 | Zhang | G06T 3/4084 | 382/190 |
| 2013/0064469 A1 * | 3/2013 | Koehler | G06T 5/50 | 382/261 |
| 2013/0135482 A1 | 5/2013 | Lamy-Bergot et al. | | |
| 2014/0152762 A1 * | 6/2014 | Ukil | G06T 3/4038 | 348/36 |
| 2014/0198992 A1 * | 7/2014 | Popov | G06T 5/002 | 382/275 |
| 2015/0131713 A1 * | 5/2015 | Kim | H04N 19/132 | 375/240.02 |
| 2015/0199587 A1 * | 7/2015 | Li | G06T 7/0012 | 382/131 |
| 2015/0206318 A1 * | 7/2015 | Parfenov | G06T 5/003 | 382/154 |
| 2016/0014433 A1 * | 1/2016 | Raina | H04N 19/89 | 375/240.27 |

OTHER PUBLICATIONS

R. Lokhande, et al., "Identification of parameters and restoration of motion blurred images", Applied Computing 20036, 21st Annual ACM Symposium on Applied Computing, vol. 1, Apr. 23, 2006, pp. 301-305.

S. Suchitra, et al., "Detection & classification of arrow markings on roads using signed edge signatures", Intelligent Vehicles Symposium, IEEE, Jun. 3, 2012, pp. 796-801.

* cited by examiner

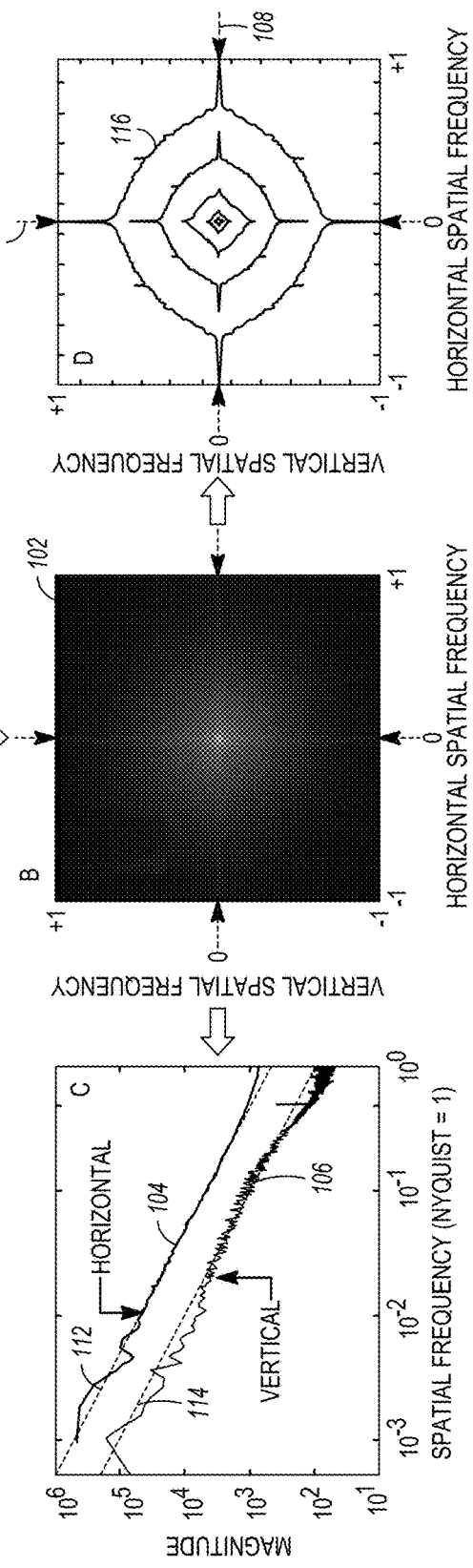
FIG. 1A
FIG. 1B
FIG. 1C
FIG. 1D

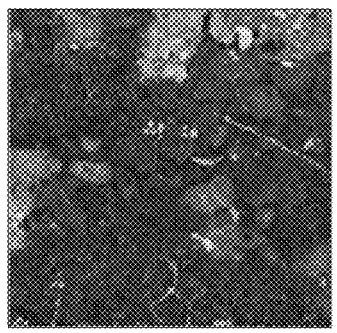
*FIG. 2A(i)*
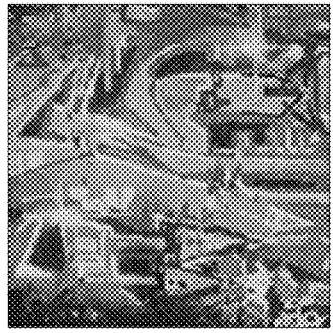
*FIG. 2A(ii)*
*FIG. 2A(iii)*
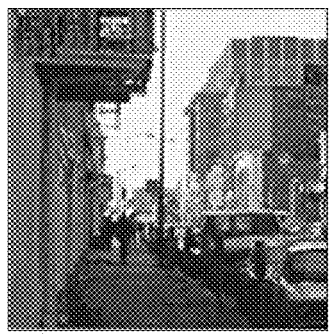
*FIG. 2A(iv)*

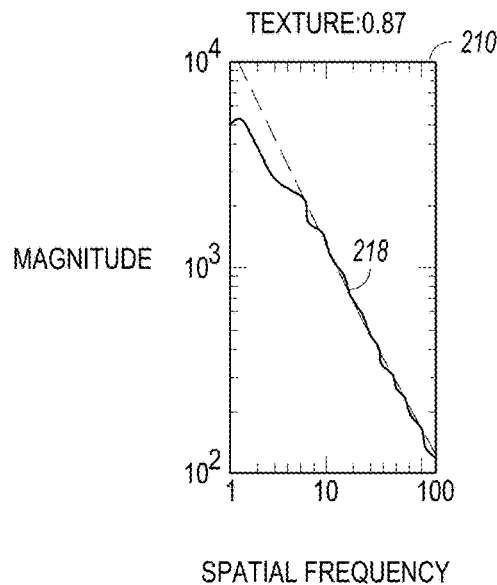
FIG. 2B(i)
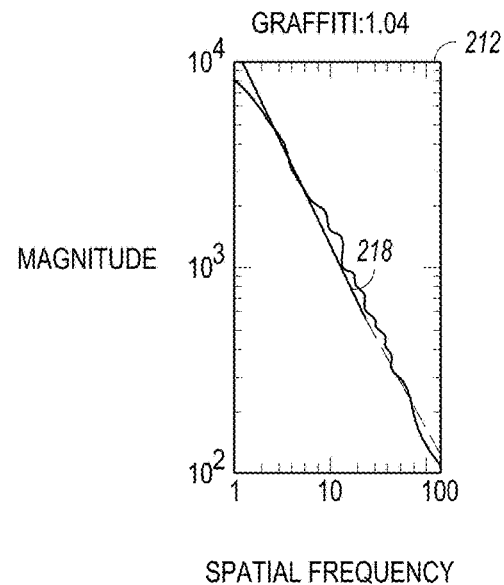
FIG. 2B(ii)
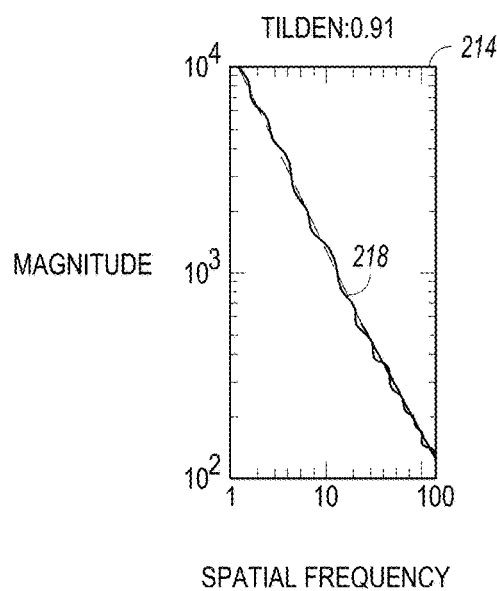
FIG. 2B(iii)
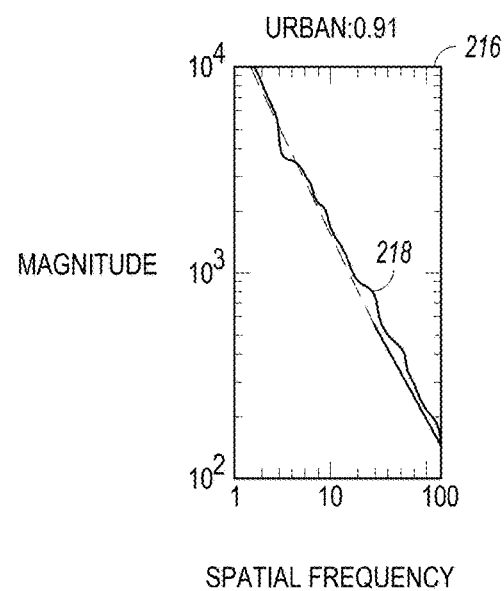
FIG. 2B(iv)

*FIG. 3A(i)*
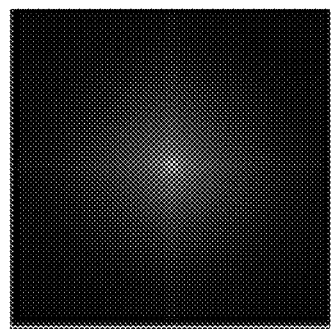
*FIG. 3A(ii)*
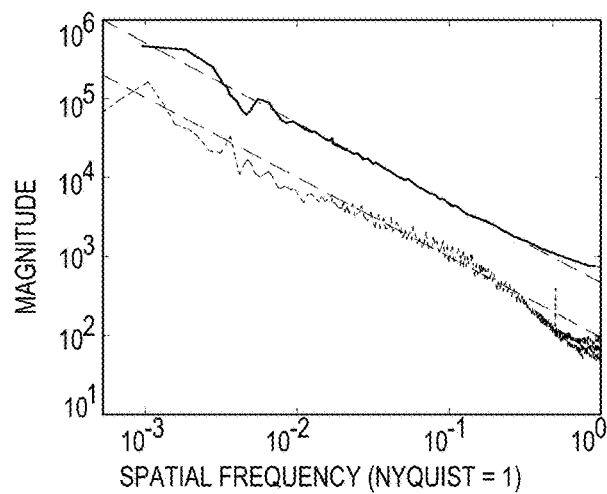
*FIG. 3A(iii)*
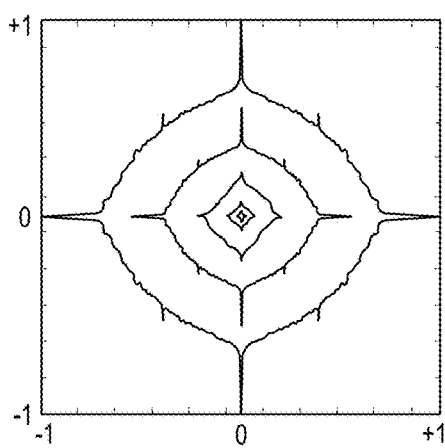
*FIG. 3A(iv)*

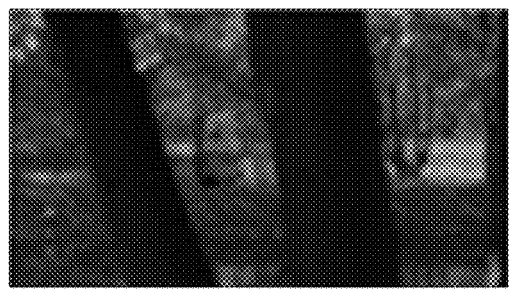
*FIG. 3B(i)*
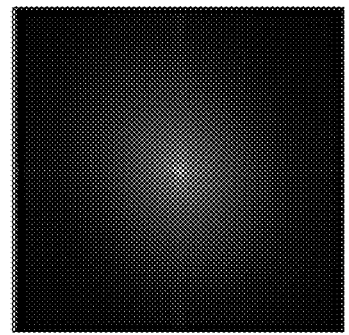
*FIG. 3B(ii)*
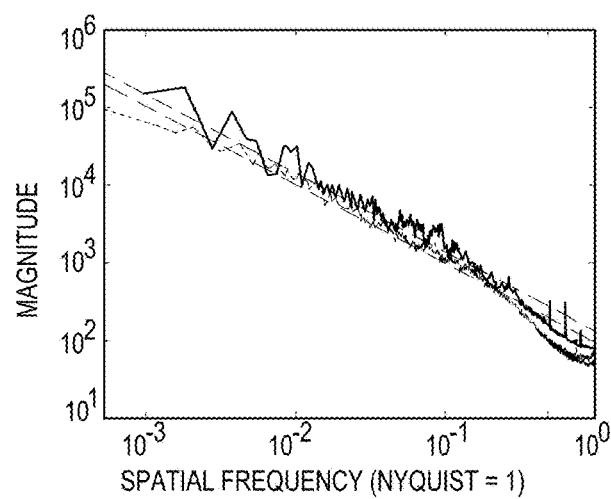
*FIG. 3B(iii)*
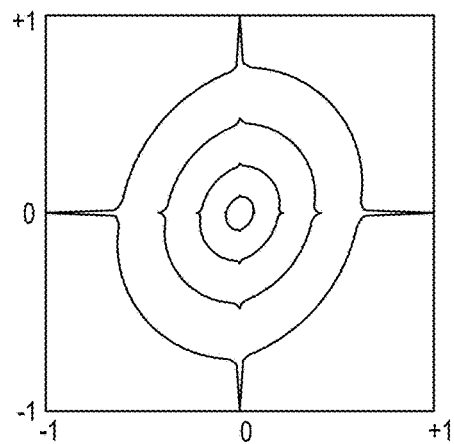
*FIG. 3B(iv)*

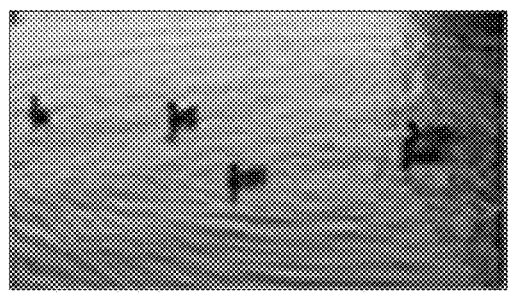
FIG. 3C(i)
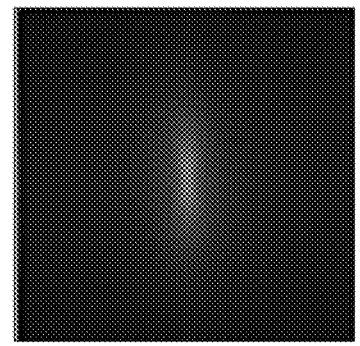
FIG. 3C(ii)
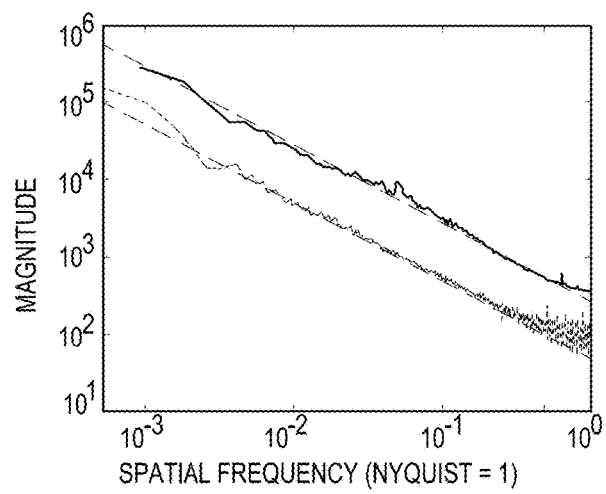
FIG. 3C(iii)
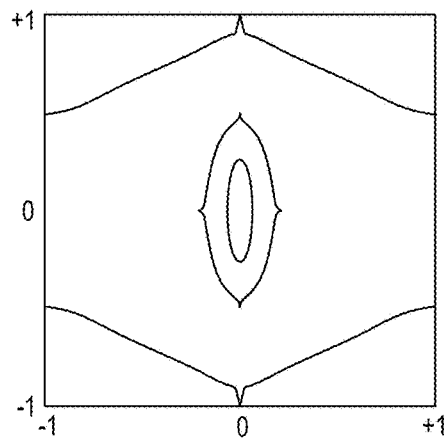
FIG. 3C(iv)

*FIG. 3D(i)*
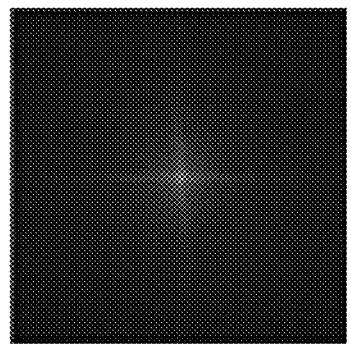
*FIG. 3D(ii)*
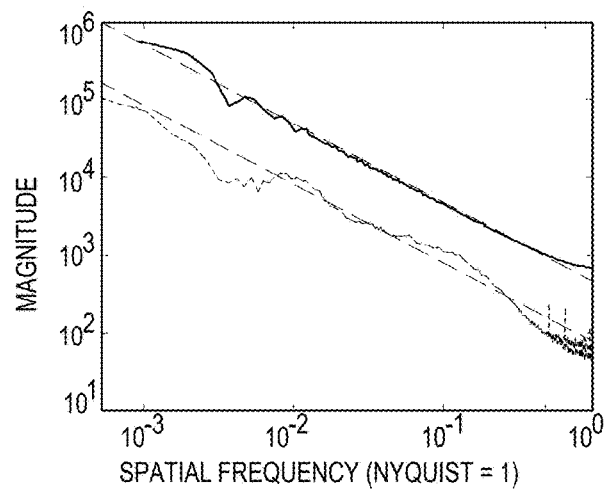
*FIG. 3D(iii)*
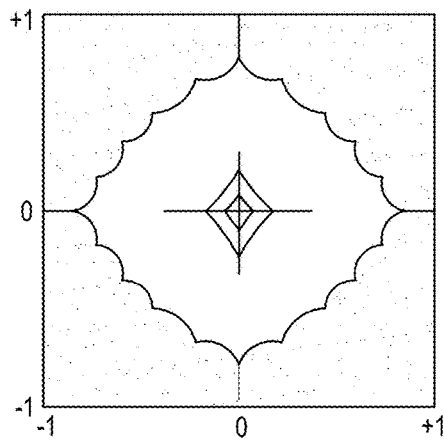
*FIG. 3D(iv)*

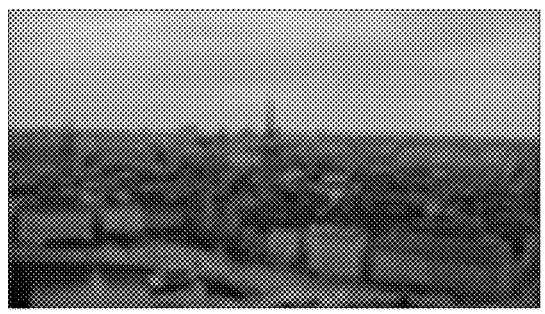
FIG. 3E(i)
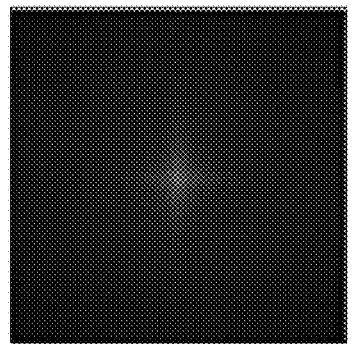
FIG. 3E(ii)
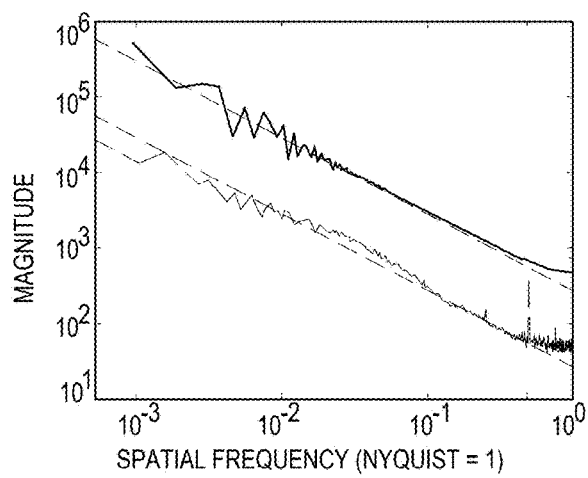
FIG. 3E(iii)
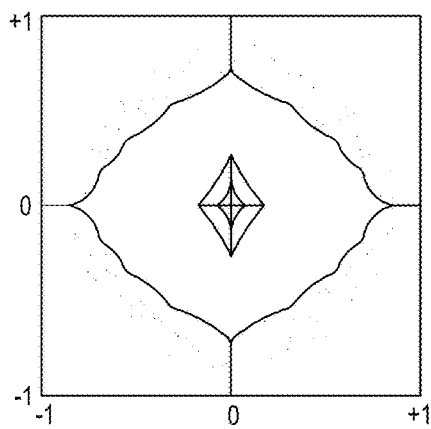
FIG. 3E(iv)

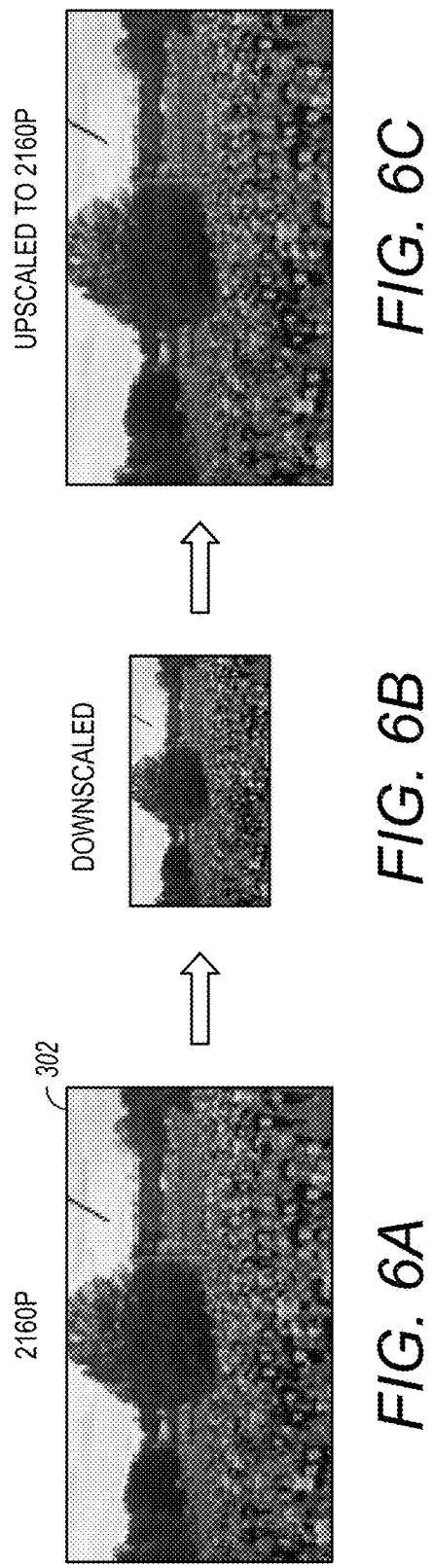

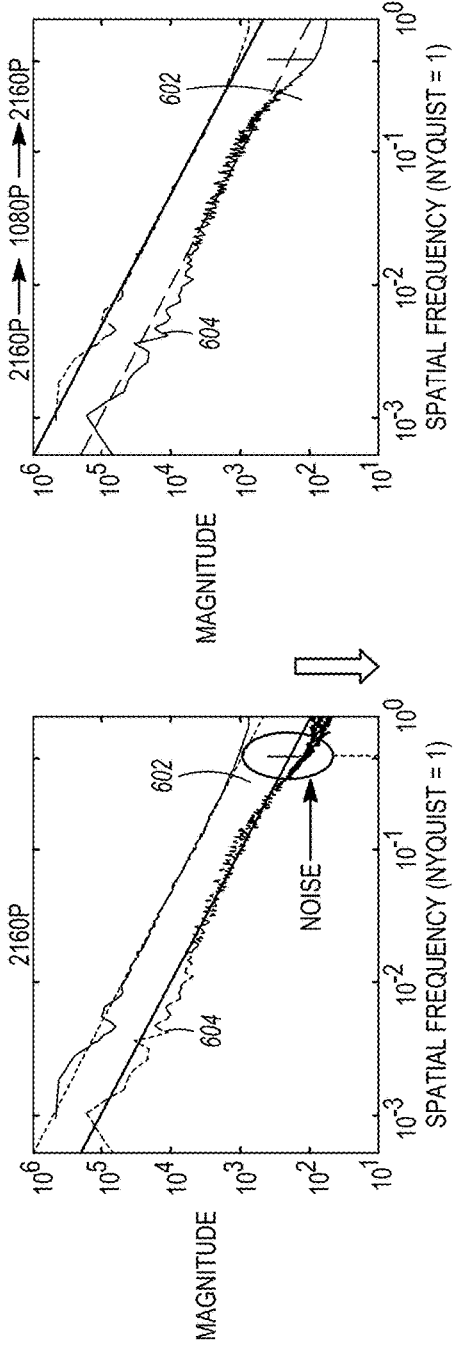
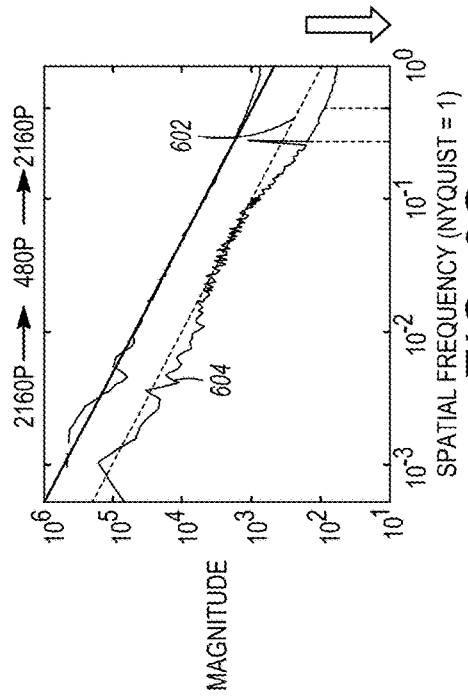
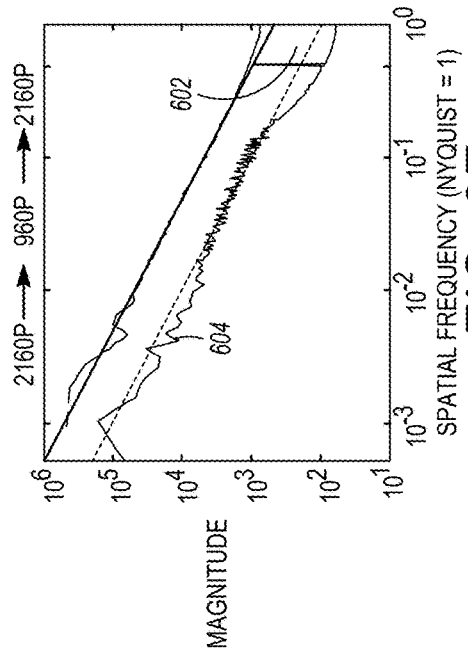

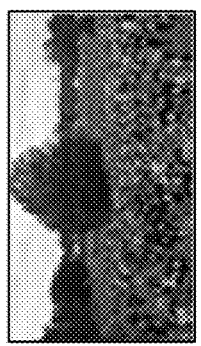
CROWDRUN
FIG. 7A
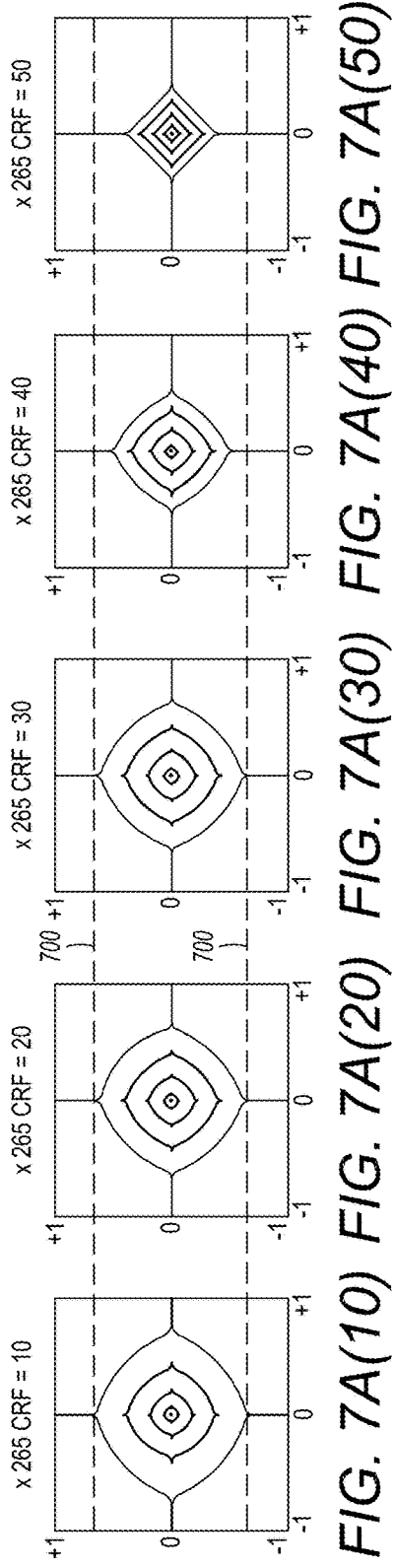
FIG. 7A(10)  FIG. 7A(20)  FIG. 7A(30)  FIG. 7A(40)  FIG. 7A(50)

PARKJOY

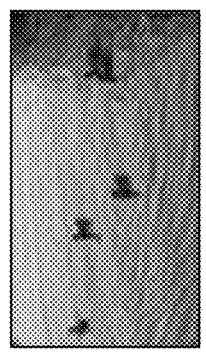
DUCKSTAKEOF
*FIG. 7C*
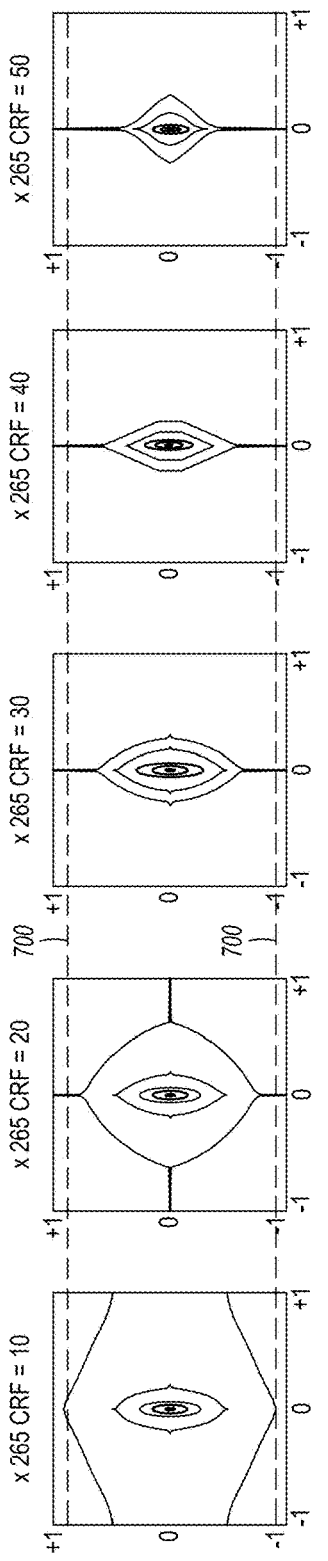
*FIG. 7C(10) FIG. 7C(20) FIG. 7C(30) FIG. 7C(40) FIG. 7C(50)*

INTOTOTREES

ODTOWNCROSS

FRAME BY FRAME CORRELATION COEFFICIENT -- COSTARICA

FRAME BY FRAME POWER LAW INTERCEPT -- COSTARICA

SYSTEM AND METHOD FOR SELECTIVELY COMPRESSING IMAGES

CROSS REFERENCE TO RELATED APPLICATIONS

This application claims priority under 35 U.S.C. § 119(e) from earlier filed U.S. Provisional Application Ser. No. 62/136,858, filed Mar. 23, 2015, the entirety of which is incorporated herein by reference.

BACKGROUND

Technical Field

The present disclosure relates generally to the field of image compression and transmission and more particularly to systems and methods for determining sensitivity of image signals to compression.

Related Art

Only a decade ago, high definition (HD) was cutting-edge video technology. With HD came new wider 16:9 aspect ratio flat screen TVs that made the living room stylish in a way that CRTs could not match. Consumers quickly adopted the new technology and studios, programmers, cable, telco, and satellite video providers rapidly began delivering the user-desired, HD content. HD is now readily available in many forms across multiple platforms.

Recently, Ultra HD (UHD), with at least 4 times as many pixels as HD, has become mainstream. In addition to and along with UHD, a new wave of television viewing options are becoming readily available. The internet has become a rival of legacy managed television distribution pipes. Over-the-top (OTT) bandwidth is now often large enough to support 4k UHD however it can place significant demands on infrastructure. New compression technologies such as HEVC are now available to make better use of video distribution channels since television itself is no longer confined to the home. Every tablet, notebook, PC, and smartphone now has a part time job as a TV screen; and more and more of those evolved-from-computer TVs have pixel density and resolution to rival dedicated TV displays.

Despite the advent of 4k HD technology, the market is still dominated by SD and HD technology displays that would not benefit from the delivery of 4k UHD signals. Moreover, infrastructure limitations may restrict the ability of content providers to deliver 4k UHD signals to end-user devices. Thus, delivery of superior 4k UHD signals may not have any impact on some end-user experiences.

4k UHD is still new enough in the studios and post-production houses that 4k-capable cameras, lenses, image sensors, and downstream processing are still being optimized and thus we cannot be sure that the optics and post processing are preserving every bit of "4k" detail. For content providers and end-users, video compression and multi-bitrate adaptive streaming protocols can change the amount of visual detail to a form that does not preserve true "4k" detail. Thus, determining appropriate compression levels for video to preserve a desired minimum level of detail (SD, HD, UHD or future-developed standards) to be sure that content providers do not over compress and turn high-quality video into something less impressive is extremely important.

Examination of 4k UHD images, reveals that several test sequences that appeared normal to the eye turned out to have unusual properties when examined mathematically. Thus, examination and evaluation of content based upon current, known evaluation techniques could lead to incorrect conclusions related to 4k UHD images and required bandwidth for services.

What is needed is a system and method to appropriately determine compressibility of images such that desired resolutions are delivered to an end users. Additionally, what is needed is a system and method to optimize compression of a video signal based upon bandwidth limitations and/or desired resolution of a delivered video signal.

SUMMARY

The present disclosure relates to a method of characterizing the effective spatial resolution of a video segment that can comprise the steps of acquiring a baseband video, then storing at least two images of said baseband video. Following the acquisition and storage, calculating a log magnitude spectrum for each of the stored images of the baseband video, then combining the log magnitude spectrum for each of the stored images of the baseband video to form an average log magnitude spectrum. Prescribed thresholds can then be applied to the log magnitude spectrum to form a signature contour of the stored images.

Some embodiments can involve a step of storing the signature contour of the stored images. Other embodiments can involve a step of generating a parametric representation of the signature contour and storing the parametric representation in a database.

Additional embodiments can also involve acquiring a second baseband video based on successive downscaling and upscaling of said baseband video, then storing at least two second images of said second baseband video. After that, a second log magnitude spectrum for each of the stored at least two second images of the second baseband video can be calculated which can then subsequently be combine with the second log magnitude spectrum for each of the stored second images of the second baseband video to form a second average log magnitude spectrum. Prescribed thresholds can then be applied to the second log magnitude spectrum to form a second signature contour of the second stored images. Then the size of the signature contour and second signature contour can be compared to determine a sensitivity of the original image to compression based on the comparison of the signature contours.

Other embodiments can involve a step of evaluating the effective spatial resolution of the first signature contour and the second signature contour and then selecting a baseband video that has maximum effective resolution at a prescribed bitrate. Some embodiments can have the maximum effective resolution less than or equal to a native resolution of an identified display. Other embodiments can have the maximum effective resolution less than or equal to a native resolution of an identified transcoder.

Still further embodiments can involve a step of generating a compressed version of a baseband video in which the compression is based, at least in part, on the signature contours.

BRIEF DESCRIPTION OF THE DRAWINGS

Further details of the present invention are explained with the help of the attached drawings in which:

FIGS. 1a-1d depict a reference image and frequency plots related to the reference image.

FIGS. 2a(i)-2b(iv) depict reference images and frequency plots related to the reference images.

FIGS. 3a(i)-3e(iv) depict reference images and frequency plots related to the reference images.

FIGS. 6a-6k depict reference images and associated frequency plots and frequency contour plots for the reference images.

FIGS. 7a-7e(50) depict reference images and associated frequency contour plots of the reference images using various constant rate factors for compression.

DETAILED DESCRIPTION

Figure 4A:
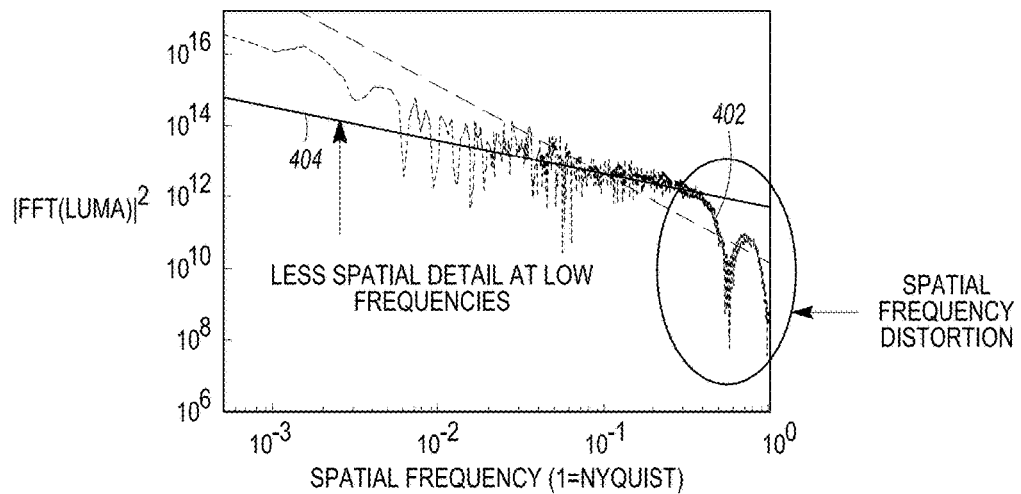
FIGS. 4a-4c depict frequency plots of images showing spatial frequency distortion.

A still frame from a video image 100 such as shown in FIG. 1a is normally thought of as a 2-dimensional array of pixels with each pixel being represented by red, green, and blue values (RGB) or luma and 2 chrominance channels (for example, YUV or YCbCr). An image 100 can also be represented as a 2-dimensional array of spatial-frequency components 102 as illustrated in FIG. 1b. The visual pixel-based image and the spatial-frequency representation 102 of the visual image are interchangeable mathematically. They have identical information, just organized differently.

Spatial-frequency representations of an image 102 can further be represented by a magnitude component FIG. 1c and a phase component (not shown). The magnitude component, called the magnitude spectrum (FIG. 1c), provides information on how much of the overall variation within the visual (pixel-based) image can be attributed to a particular spatial frequency—in which the spatial frequency is 2-dimensional having a horizontal part 104 and vertical part 106. The phase component (not shown), called the phase spectrum (not shown), provides information on how the various spatial frequencies interact to create the features and details that individuals recognize in images.

Spectral information regarding an image 100 can also be displayed as a contour map (FIG. 1d) by plotting the horizontal spatial frequency against the vertical spatial frequency. It will become apparent that contour maps of the log of the magnitude spectra, as shown in FIG. 1d, can be used to create a signature of the 2-dimensional spatial frequency composition of images.

FIGS. 1a-d depict the representation of an image 100 in terms of spatial frequencies in various forms 1b-1d. The visual pixel-based image 100 can be represented as a 2-dimensional array of complex numbers using Fourier transform techniques. The absolute-value of the complex numbers is shown as a 2-dimensional magnitude spectrum 102 FIG. 1b, in which brighter areas correspond to larger magnitude values. FIG. 1b depicts the data as the log of the magnitude spectrum to aid visualization and he horizontal and vertical frequency axes are shown relative to the corresponding Nyquist frequency (±1).

FIG. 1c depicts the magnitudes of the main horizontal and vertical spatial frequency axes. The main horizontal spatial frequency axis corresponds to zero vertical frequency 108, and the main vertical spatial frequency axis corresponds to zero horizontal spatial frequency 110. It is well known that images of natural scenes are expected to exhibit a spatial frequency distribution that is characterized by a 1/spatial frequency magnitude characteristic. The dashed lines 112, 114 in FIG. 1c indicate the 1/spatial frequency statistical expectation for natural scenes (the 1/spatial frequency appears as a line in the semi-log plot).

A contour map 116 of the log of the magnitude spectrum is shown in 1d. Contour maps provide useful signatures of the overall 2D magnitude spectrum and it should be noted that the magnitude spectrum is mirror symmetric around the 0,0 point (center of FIGS. 1b and 1d) along the main horizontal and vertical axes. Thus only the values from 0 to 1 (Nyquist frequency) are shown in FIG. 1c. It should be further noted that the data shown in FIGS. 1b-d were obtained by averaging the magnitude spectrum of individual frames over 250 frames (5 seconds) of the video image 100.

Images of natural scenes generally have an interesting statistical property: They have spatial-frequency magnitude spectra that tend to fall off with increasing spatial frequency in proportion to the inverse of spatial frequency. The magnitude spectra of individual images can vary significantly, but as an ensemble-average statistical expectation, it is generally reasonable to assume that the magnitude spectra of images of natural scenes fall off as one-over-spatial-frequency. This statement applies to both horizontal and vertical spatial frequencies. Examples of images which adhere to this statistical expectation are shown in FIG. 2a.

Of particular note is that "natural-scene" images are not limited to pictures of grass and trees and those items typically considered as part of nature. That is, any visually complex image of a 3-dimensional environment tends to have the one-over-frequency characteristic, though man-made environments tend to have stronger vertical and horizontal bias than unaltered landscape. The one-over-frequency characteristic can also be thought of as a signature of scale-invariance, which refers to the way in which small image details and large image details are distributed. However, images of text and simple graphics do not tend to have one-over-frequency magnitude spectra.

FIGS. 2a(i)-2b(iv) depict examples of images 202, 204, 206, 208 adhering to the 1/f statistical expectation. These images 202, 204, 206, 208 illustrate the well-established statistical expectation that the magnitude spectra of images of natural scenes tend to be inversely proportional to spatial frequency. In the semilog plots 210, 212, 214, 216, shown in FIGS. 2b(i)-2b(iv), this relationship to images 20, 204, 206 and 208 respectively, renders as a straight line. In each plot 210, 212, 214 and 216, the anticipated 1/spatial frequency characteristic 218 is plotted as a dashed line.

FIGS. 3a(i)-3e(iv) depict 4k UHD test images 3a(i)-3e(i) that have statically expectable magnitude spectra. The 4k UHD test images "CrowdRun" 3a(i), "ParkJoy" 3b(i), "DucksTakeOff" 3d(i), "InToTrees" 3d(i), and "OldTown-Cross" 3e(i) are stored at 3840×2160 pixel images at 50 frames per second. The corresponding visual (pixel-based) images 3a(ii), 3b(ii), 3c(ii), 3d(ii) and 3e(ii) are shown directly below their corresponding images 3a(i)-3e(i). Directly below that are log of the magnitude spectrum averaged over 250 frames (5 seconds) 3a(iii), 3b(iii), 3c(iii), 3d(iii) and 3e(iii) each also showing main horizontal and vertical axis components 302 304. Finally, contour maps 3a(iv), 3b(iv), 3c(iv), 3d(iv) and 3e(iv) of the log average magnitude spectrum are shown below each magnitude spectrum respectively. It should be noted that each of the sequences can be well-described by the one-over-frequency statistical expectation dashed lines 302 and 304. It should also be further noted that the contour maps 3a(iv)-3e(iv) provide concise distinguishing information about each image sequence 3a(i)-3e(i).

Figure 4B:
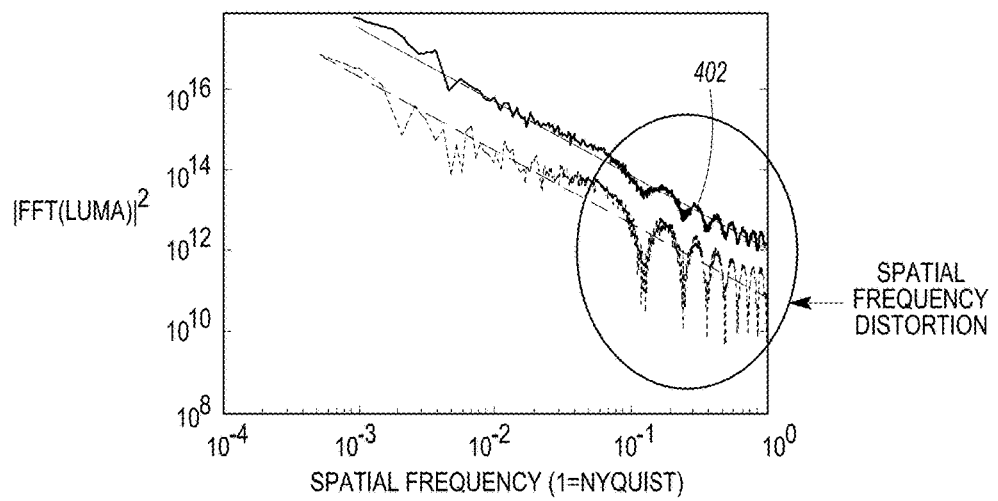
Figure 4C:
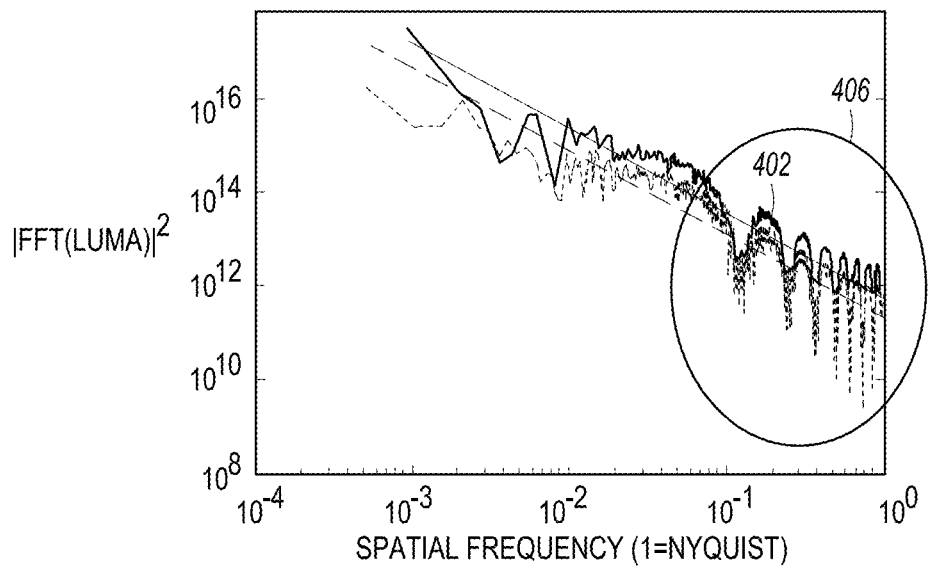
Figure 5A:
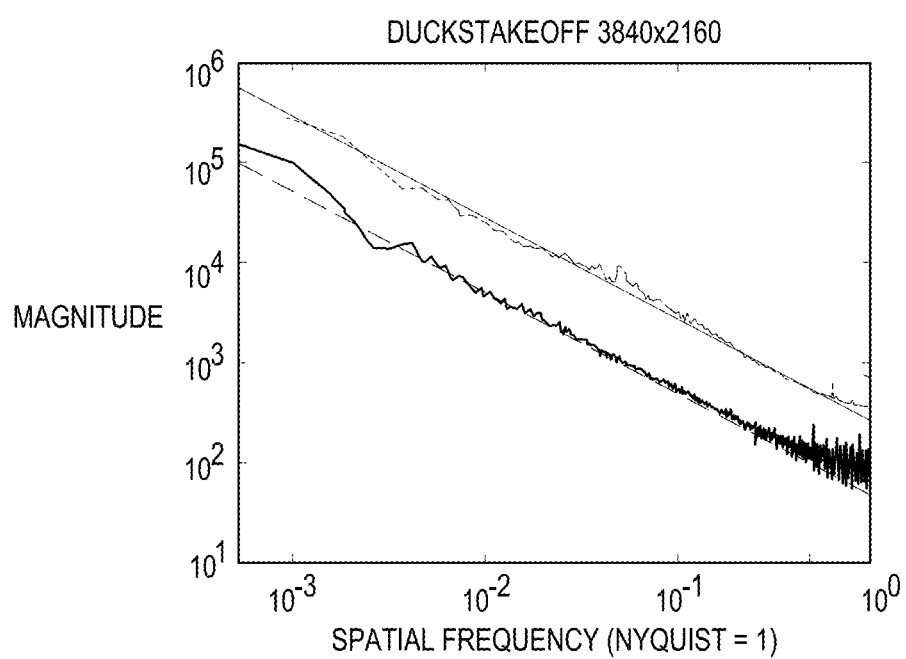
FIG. 5a-5e depict frequency plots of images.
Figure 5B:
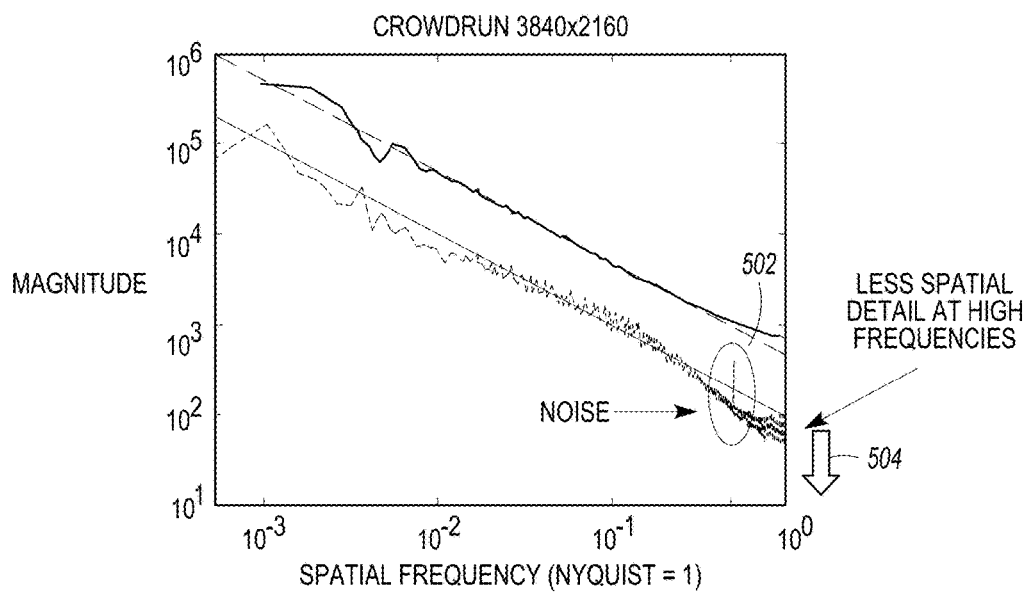
Figure 5C:
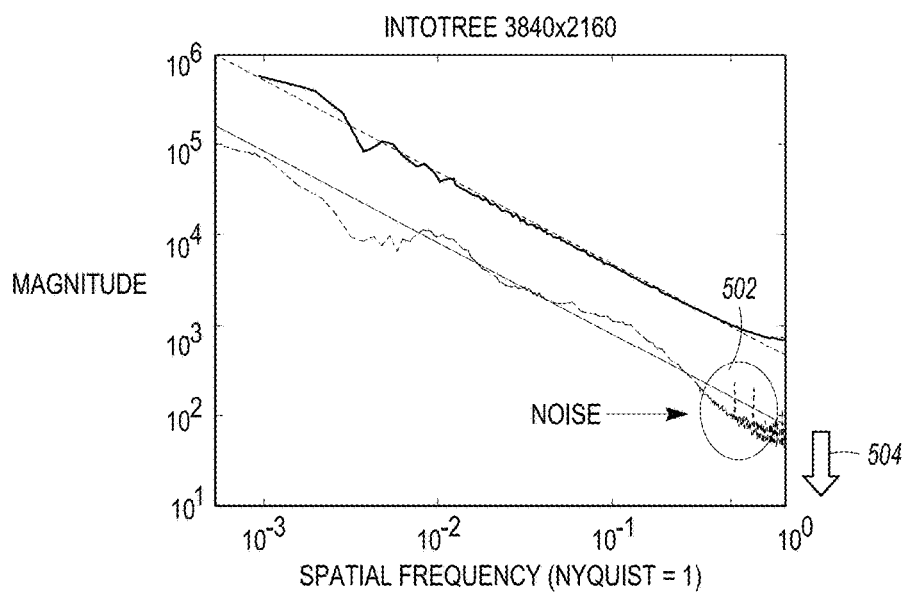
Figure 5D:
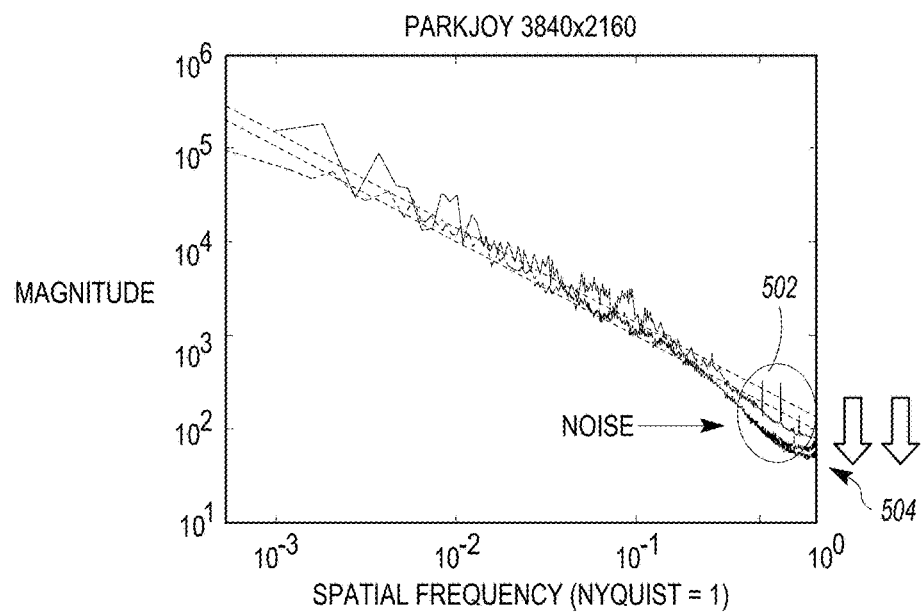
Figure 5E:
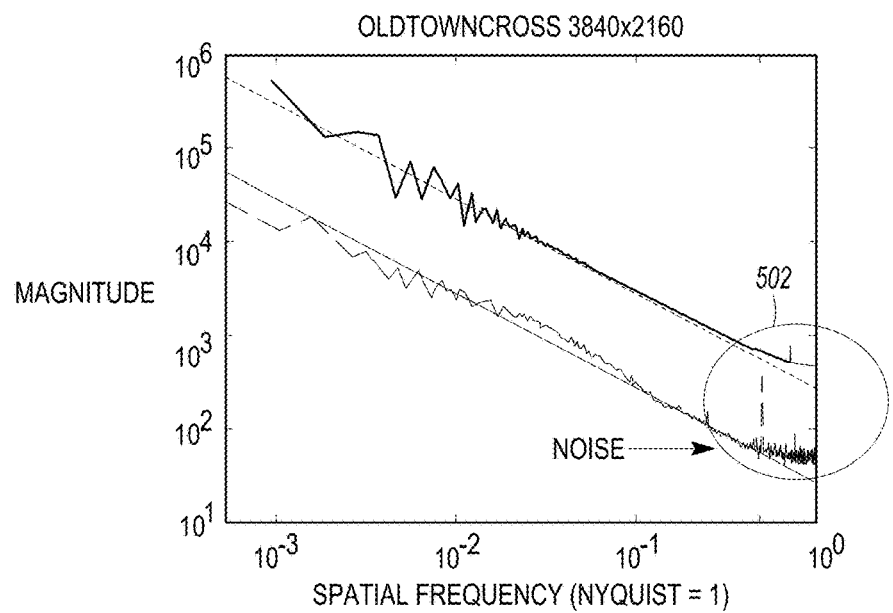

FIGS. 4a-4c depict examples of normal-appearing UHD test sequences that do not have statically expectable magnitude spectra. This demonstrates that some 4k UHD test sequences from various sources that appeared normal to the eye were found to have spatial magnitude spectra that were inconsistent with statistical expectations. Typical deviations from statistical expectations included: notch-like frequency distortions 402; excessive or diminished high or low frequency spatial detail (non-one-over-frequency behavior) 404; and extraneous noise 406.

FIGS. 5a-5e depict the same series of sequences from FIGS. 3a(i)-3e(i), respectively, except in 4k UHD. It is important to note that these sequences in 4k UHD demonstrate subtle deviations 502 from the anticipated one-over-frequency behavior. As shown, these subtle deviations 502 typically take to the form of extraneous noise that shows up as isolated peaks and less-than-expected levels of high-frequency spatial detail (indicated by arrows pointing down 504).

The test sequences shown in FIGS. 3a(i)-3e(i) are broadly in line with statistical expectations, but they do show subtle deviations as illustrated in FIG. 5a-5e. As noted above, these deviations are mainly the presence of isolated narrow-band noise-like distortions and mild loss of high-frequency high spatial detail. This illustrates a method of scrutinizing candidate 4k UHD content to an extent not possible with the eye alone.

Figure 6I:
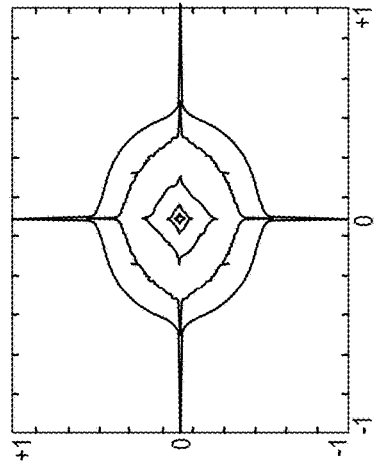
Figure 6K:
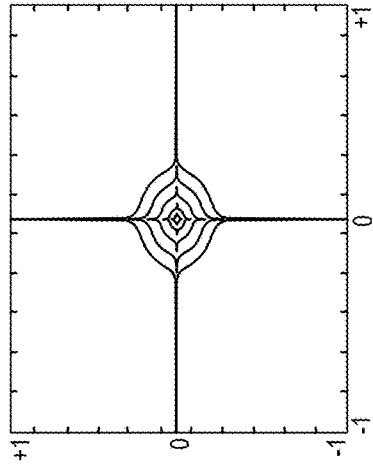
Figure 6H:
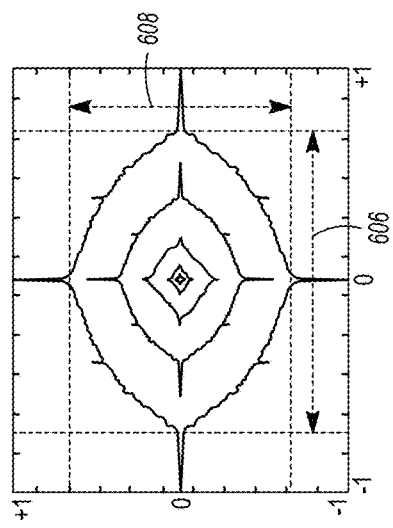
Figure 6J:
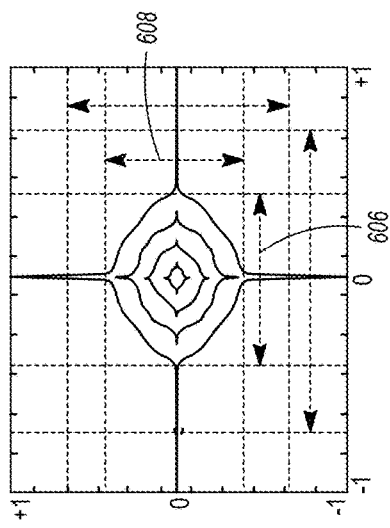

FIG. 6a depicts an image 600 in its original resolution, 2160p. FIG. 6b depicts the same image 600 downscaled and FIG. 6c presents the same downscaled image upconverted. FIGS. 6d-6g depict magnitude spectra for the same image 600 in its base 2160p form 6d, after the image 600 has been downscaled to 1080p and then upscaled to 2160p 6e, after the image 600 has been downscaled to 960p and then upscaled to 2160p 6f and after the image 600 has been downscaled to 480p and then upscaled to 2160p 6g. Observation of the magnitude spectra 6d-6g shows that there is a deviation 602 from the anticipated, one-over-frequency behavior. FIGS. 6h-6k depict the associated contour maps associated with FIGS. 6d-6g, respectively. The reduction in the widths 606 608 of the various contour maps of the downscaled and upconverted images demonstrates the sensitivity of the image 600 to various forms of compression. As shown, FIG. 6d-6g and correspondingly FIGS. 6h-6k simulate such a situation by downscaling and then upscaling back to 3840×2160 resolution using ffmpeg. From left to right, the downscaled resolution is: unaltered 3840×2160; 1920×1080; 960×540; and 480×270 as an extremum. Note that examination of only the main horizontal and vertical axes of the magnitude spectrum (middle row) reveals some differences 602, most notably some reduction in high-frequency spatial detail and shift in the narrow-band noise. The contour maps FIGS. 6h-6k of the log of the average magnitude spectrum provide quantifiable evidence of the impact of the downscaling and upscaling. The contour levels are the same for all columns. Thus the constriction of the contours towards the center indicated that the magnitude spectrum narrows (loses high-frequency spatial detail) thus quantifying the reduced effective resolution. Thus, this illustrates that the contour map method can be a sensitive measure of effective resolution of candidate test video.

FIGS. 6a-6k illustrate a method of analyzing the effective resolution of "4k" (3184×2160) resolution test content more quantitatively than can be done by eye. It is well-known that a reduced effective resolution correlates to a loss of high-frequency spatial detail. This loss can be seen by inspecting the main horizontal and vertical axes of the magnitude spectrum. Because modern rescaling algorithms are very sophisticated and the difference between lowered effective resolution and full resolution can be subtle, the contour maps of the log of the magnitude spectrum can be a much more sensitive indicator of effective resolution. Thus, testing for 4k UHD to determine susceptibly to loss of effective resolution due to downscaling and subsequent upscaling can be performed by determining the average radius of the outermost contour and determining acceptable radius thresholds and/or radius ratio thresholds.

Figure 7B:
Figure 7B:
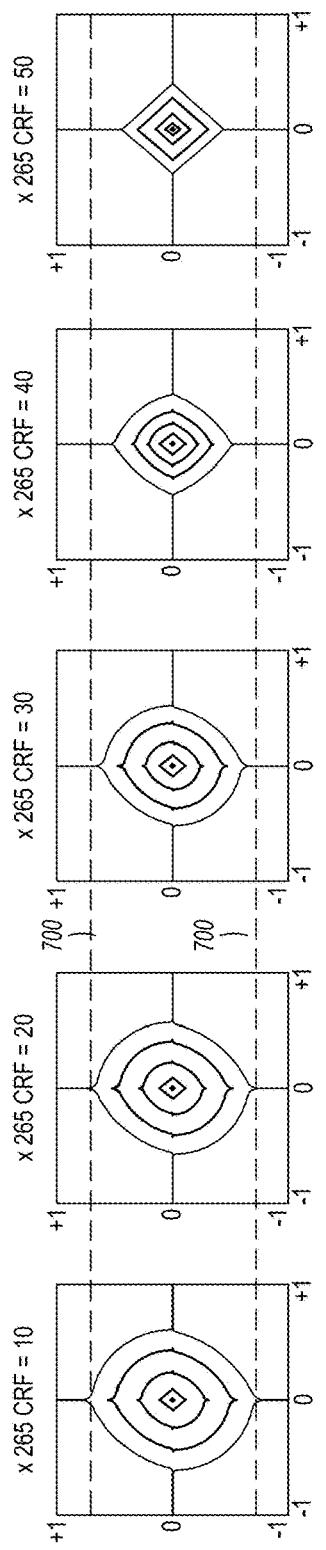
Figure 7D:
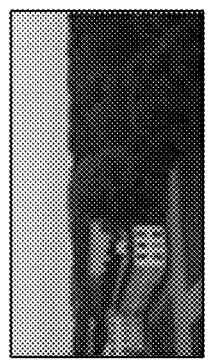
Figure 7D:
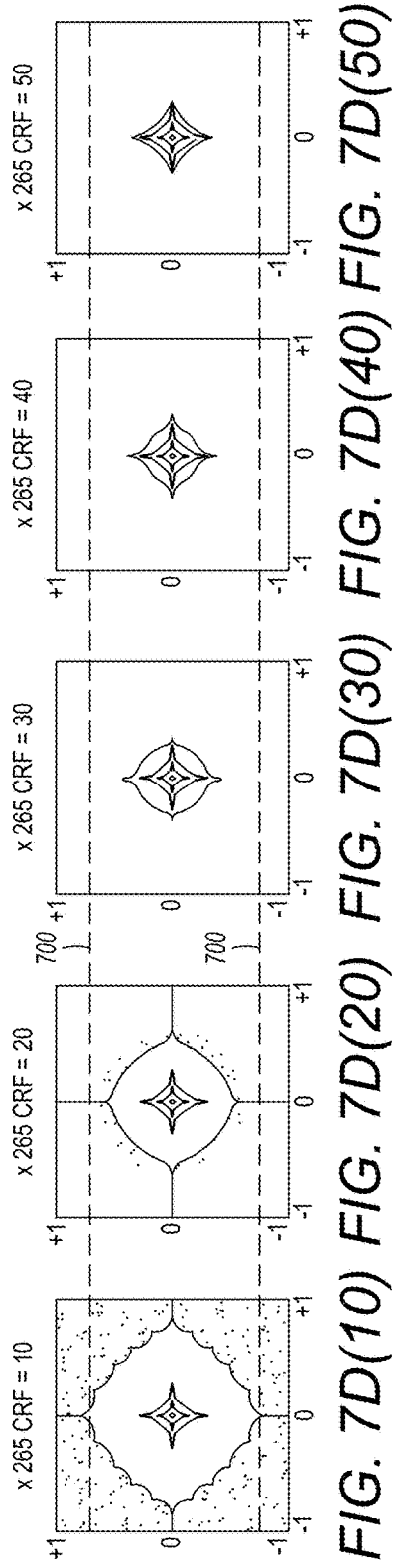
Figure 7E:
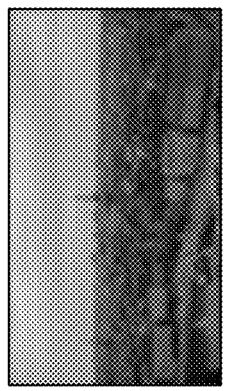
Figure 7E:
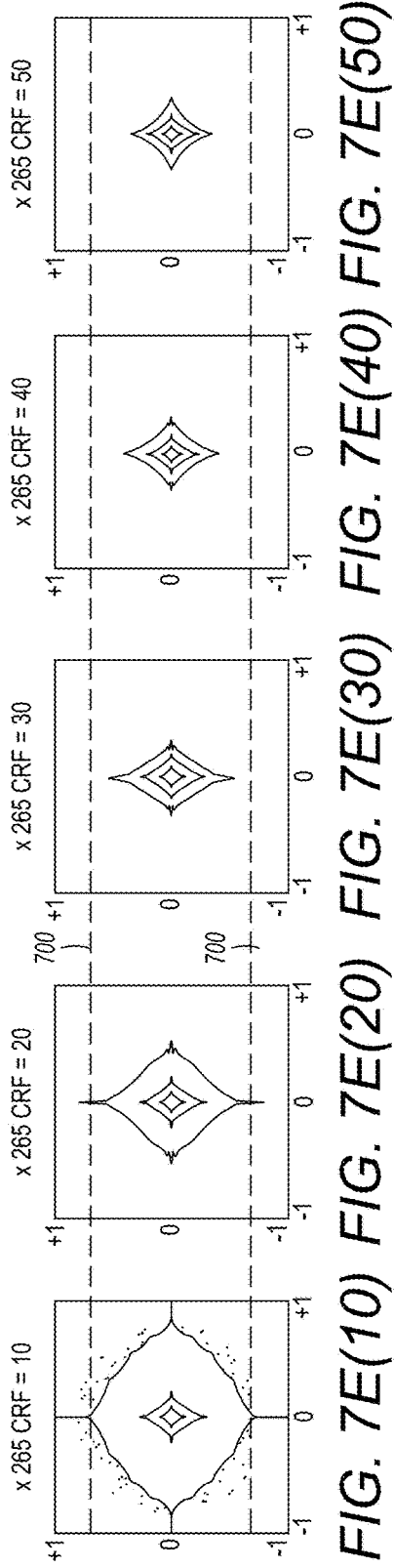

FIG. 7a-7e(50) depict a non-limiting example of using contour maps of magnitude spectra to examine the effect of video compression on images 7a-7c. FIGS. 7a(10), 7a(20), 7a(30), 7a(40) and 7a(50) are the contour maps of the average (250 frames, 5 seconds) of the log magnitude spectrum of each of the 4k UHD test sequences compressed with HEVC to various levels, constant rate factor (crf) 10, 20, 30, 40 and 50, respectively, using the libx26514 library with ffmpeg to perform the HEVC compression. The crf value noted at the top of each column indicates the value of the constant rate factor (crf) parameter used in the ffmpeg libx265 command line. Smaller values of crf created more lightly compressed video. Video compressed with a crf value of 50 is typically very heavily artifacted. It is of particular note that the images 7a-7e and the associated contour maps 7a(10)-7e(50) show that video compressed with a crf value of 10 produces contour maps that are very similar to those for uncompressed video, as shown in FIGS. 3a(iv)-3e(iv). The contour maps also show that the impact of the crf value is content dependent. For "CrowdRun" FIG. 7a and "Park-Joy" FIG. 7b, the crf values below ~30 do not a have a major impact on effective resolution. On the other hand, a noticeable change in effective resolution is evident for a crf value of 20 for "IntoToTrees" FIG. 7c, "DucksTakeOff" FIG. 7d, and "OldTownCross" FIG. 7e. Across FIGS. 7a(10)-FIG. 7e(50) the dashed lines 700 provide a reference for the radial extent of outer contour of the lightly compressed and uncompressed versions of the video. This demonstrates that video compression changes the amount of spatial detail in video, but the extent to which spatial detail is lost depends of the content itself and the aggressiveness of compression; i.e. the target bitrate.

In operation FIGS. 7a-7e(50) demonstrate a method of testing the effective resolution of HEVC compressed content and shows that effective resolution is more sensitive to compression for some kinds of content compared to other kinds of content. As such, evaluation of contour maps can be used to optimize the selection of compression levels to be applied for the delivery of video. Alternately, evaluation of the contour maps can be used to determine a required minimum bitrate needed to achieve a desired effective resolution. Still further alternately, a comparison of the contour maps can be used to determine a required compression level (and therefore a maximum effective resolution) needed based upon available bandwidth. Additionally, a log of the magnitude spectra can also be sensitive indicators of effective resolution.

Figure 8A:
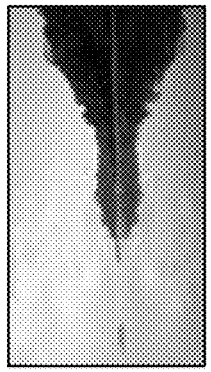
FIGS. 8a-8b depict a reference image and a comparison of frame-by-frame predicted power law slope and actual calculated slope.
Figure 8B:
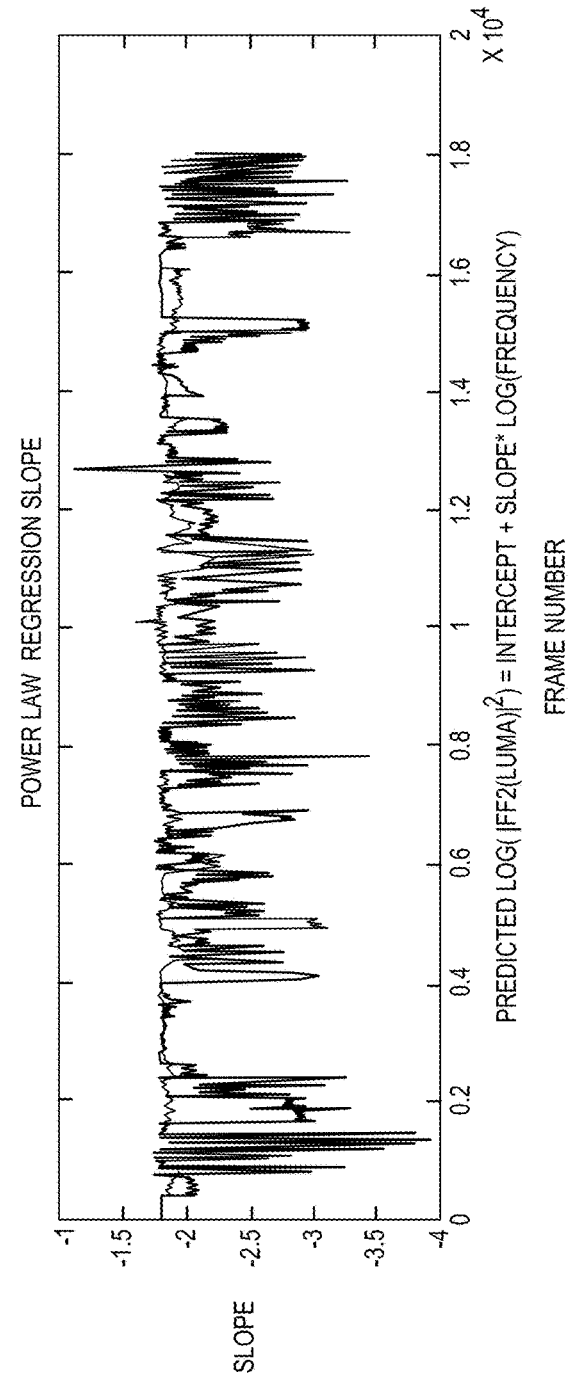
Figure 9A:
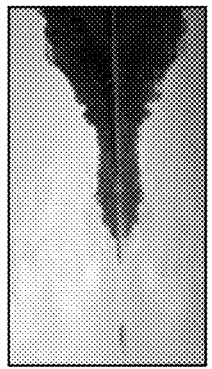
FIGS. 9a-9b depict a reference image and a comparison of frame-by-frame predicted power law correlation and actual calculated correlation.
Figure 9B:
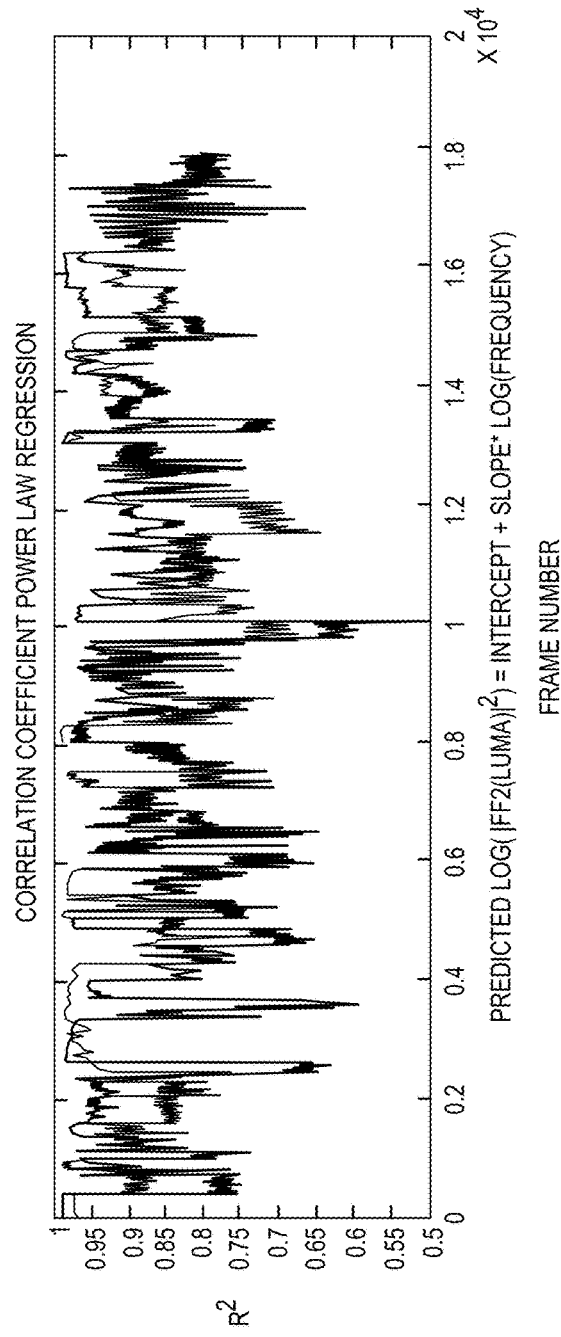
Figure 10A:
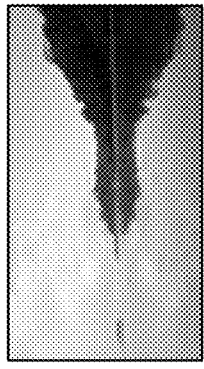
FIGS. 10a-10b depict a reference image and a comparison of frame-by-frame predicted power law intercept and actual calculated intercept.
Figure 10B:
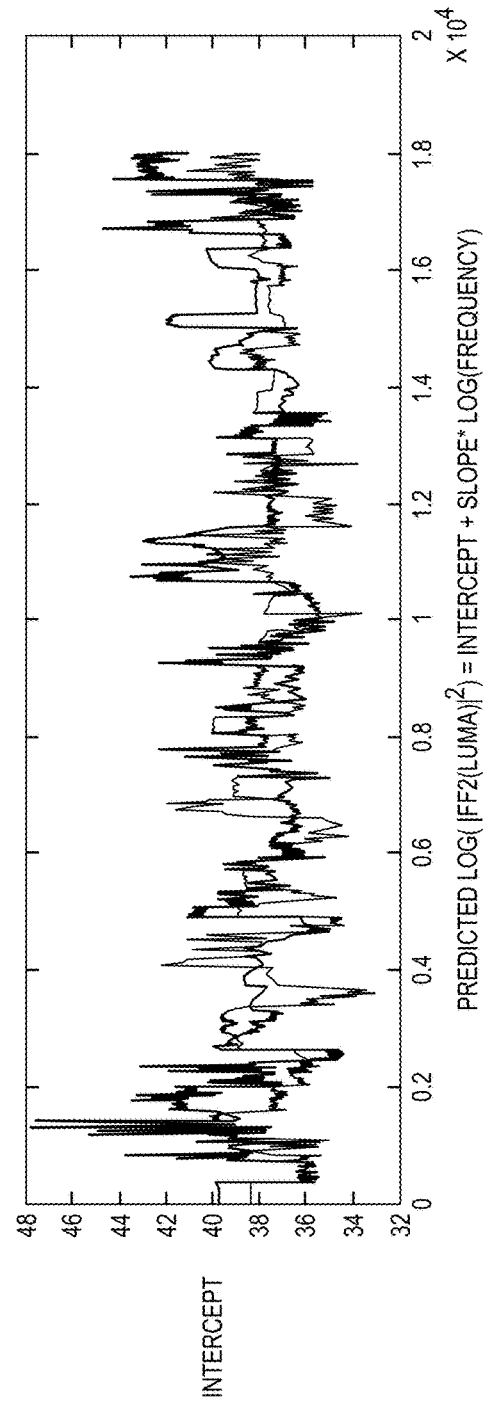

FIGS. 8a-8b depict how the slope of a regression line fitted to the spatial frequency magnitude spectrum can be used to characterize video content on a frame-by-frame basis. FIGS. 9a-9b depict how a correlation value can be used to characterize video content on a frame-by-frame basis and FIGS. 10a-10b depict how an intercept value can be used to characterize video content on a frame-by-frame basis. This kind of metadata can be used in scene-change detection, fade-detection, optimization of bit rate, rate control and/or for any other known and/or convenient detection and/or optimization process. Both the slope and radius information help characterize the video content on a frame-by-frame basis. Such data can be used to optimize video processing decisions for individual video streams and to optimize distribution of multiple channels. These methods apply to multicast, unicast, and mixtures of multicast and unicast.

The frame-by-frame statistics of slope, correlation and intercept can be used in several ways to evaluate or characterize a video signal. First, any or all of the slope and intercepts and correlation coefficient can be used to segment by looking for frame-to-frame differences that are larger than a prescribed threshold. The average spectra and corresponding contours can then be calculated for each segment individually and used on a segment-by-segment basis to optimize, monitor, or classify a video signal. Further, the detection of segment boundaries can also trigger changing the compression parameters on a segment-by-segment basis. By way of non-limiting example, a large intercept could indicate a video segment with large spatial variations within a frame. In such cases, it could be beneficial to increase the strength of compression.

In some embodiments, frame-by-frame data can be examined relative to the correlation coefficient to determine if any section of video matched the 1/f expectation, and compression could be adjusted accordingly. By way of non-limiting example, if the correlation coefficient is small and the slope is small then the video signal could contain noise or random textures. In such a case, it could be beneficial to adjust the strength of noise filters and/or any other known and/or convenient signal processing step. In a still further non-limiting example, a small correlation coefficient could also indicate that the video contains simple graphics. In which case, compression parameters could be optimized for graphics.

A key feature of adaptive streaming protocols is the inclusion of reduced-resolution versions of content in order to provide uninterrupted video service even when a consumer's available bandwidth is significantly curtailed. Although compressed and delivered at a resolution less than full 4k resolution, the content seen by a viewer can be upconverted to 4k resolution by either a set top box or the television display itself. In this way, the effective delivery resolution is less than the displayed resolution. Thus, it is important to understand the sensitivity of a final signal resolution to compression after it is compressed, delivered and subsequently upconverted.

UHD 4k displays have such high resolution, and upconversion algorithms have become so good, that it is sometimes difficult to see by eye if a particular video is pristine full resolution or if some upconversion has occurred in the preparation of the content.

Figure 11:
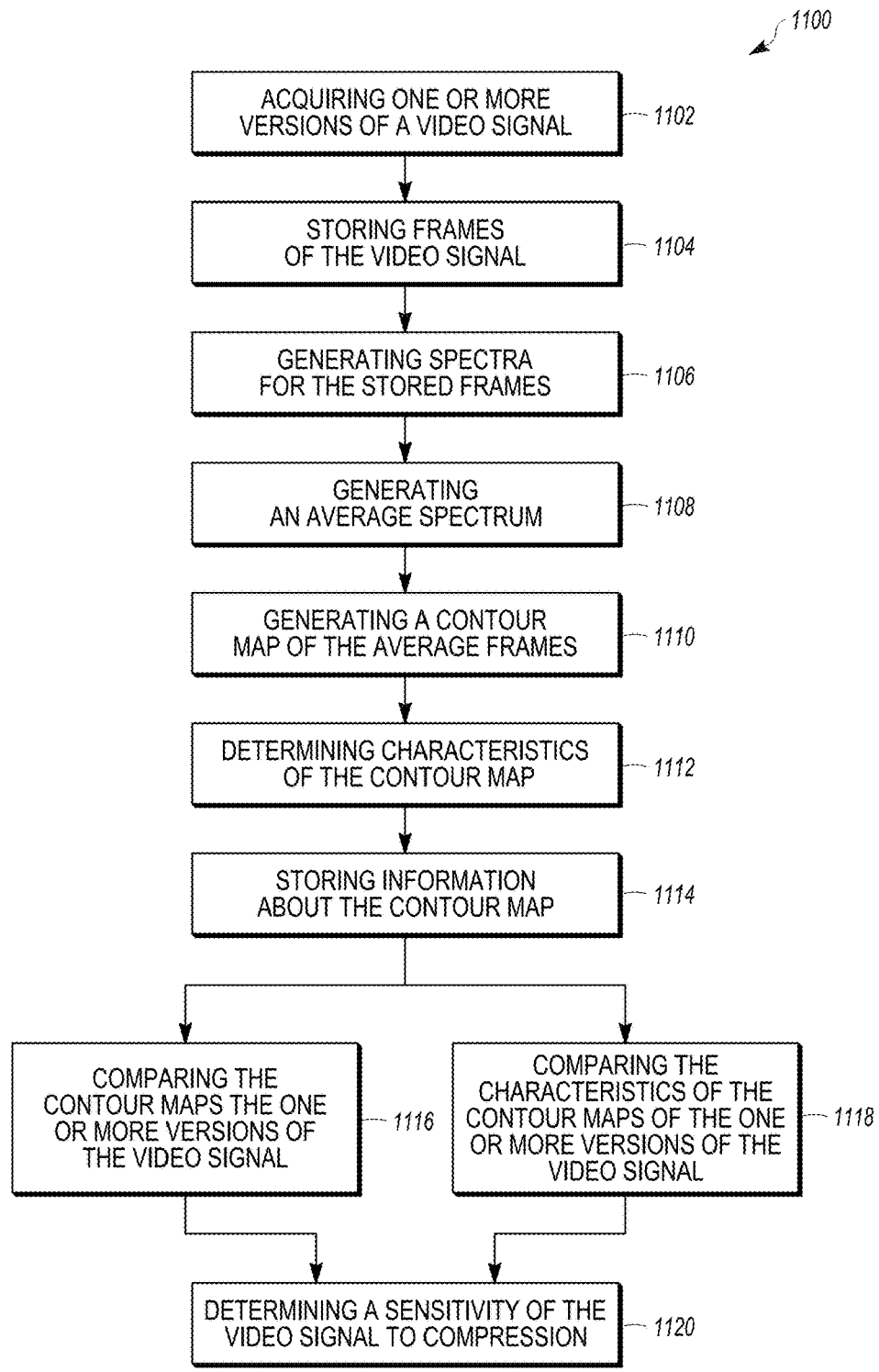
FIG. 11 depicts an embodiment of an exemplary process for determining a sensitivity of reference video to compression.

FIG. 11 depicts an embodiment of a use case method for quantifying a sensitivity of a video signal to signal compression 1100. In the embodiment depicted in FIG. 11, one or more versions of a video signal is/are acquired in step 1102 and stored in step 1104. Acquisition and storage of the video signal can be performed using any known, convenient and/or desired process. In step 1106, frequency spectra can be generated for desired frames of the video signal. The frames of the video signal can be sampled at any desired frequency and the frequency spectra for the frames can be determined by any known, convenient and/or desired process. In some embodiments, the spectra can be calculated using a Fast Fourier Transform. However, in alternate embodiments any known, convenient and/or desired process can be used to determine the spectra.

In step 1108 an average spectrum is calculated based on at least a portion of the calculated spectra from step 1106. The average spectrum from step 1108 can then be used to calculate a contour map of the average spectrum in step 1110 and the characteristics of the contour map can be calculated in step 1112. Then the information regarding the characteristics of the contour map can be stored in step 1114. Steps 1102-1114 can additionally be performed on an alternate version of the video signal. In some embodiments, the alternate version of the video signal can be the original signal that has been downscaled and then upscaled to an original format.

In either or both steps 1116 or 1118 the characteristics of the contour map or the contour map of the original signal can be compared with the characteristics of the contour map or the contour map and based on the comparison the sensitivity of the video signal to compression can be determined based on a prescribed ratio and/or threshold.

Figure 12:
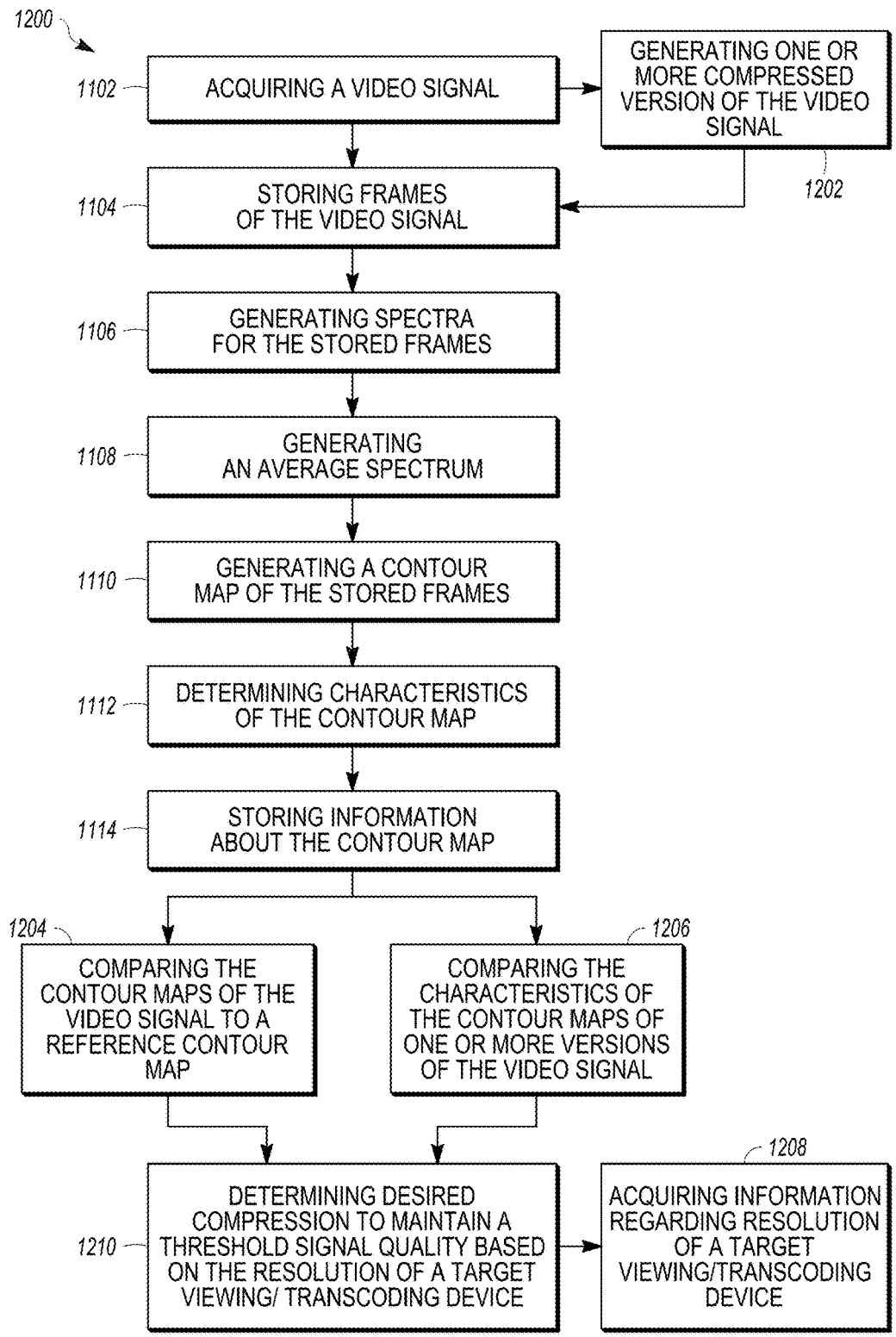
FIG. 12 depicts an embodiment of an exemplary process for determining a desired video compression in order to maintain a desired signal quality.

FIG. 12 depicts an embodiment of a method of determining a signal compression 1200, comprising the steps of acquiring a video signal 1102 and generating one or more versions of the video signal 1202 and storing them in step 1104.

Acquisition and storage of the video signal can be performed using any known, convenient and/or desired process. In step 1106, frequency spectra can be generated for desired frames of the video signal. The frames of the video signal can be sampled at any desired frequency and the frequency spectra for the frames can be determined by any known, convenient and/or desired process. In some embodiments, the spectra can be calculated using a Fast Fourier Transform. However, in alternate embodiments any known, convenient and/or desired process can be used to determine the spectra.

In step 1108 an average spectrum is calculated based on at least a portion of the calculated spectra from step 1106. The average spectrum from step 1108 can then be used to calculate a contour map of the average spectrum in step 1110 and the characteristics of the contour map can be calculated in step 1112. Then the information regarding the characteristics of the contour map can be stored in step 1114. Steps 1102-1114 can additionally be performed on an alternate version of the video signal. In some embodiments, the alternate version of the video signal can be the original signal that has been downscaled and then upscaled to an original format.

In either or both steps 1204 or 1206 the characteristics of the contour map or the contour map of the original signal can be compared with the characteristics of a reference contour map or a reference contour map.

In step 1208, information regarding the resolution of a target device can be acquired. In some embodiments the target device can be a video display device and/or a transcoding device.

In step 1210, a compression level can be selected based up the resolution of a target device and the calculated compression sensitivity of the video signal. In some embodiments, a threshold values for a contour map and/or contour map characteristics can be established that correspond to an effective resolution on a target device.

Figure 13:
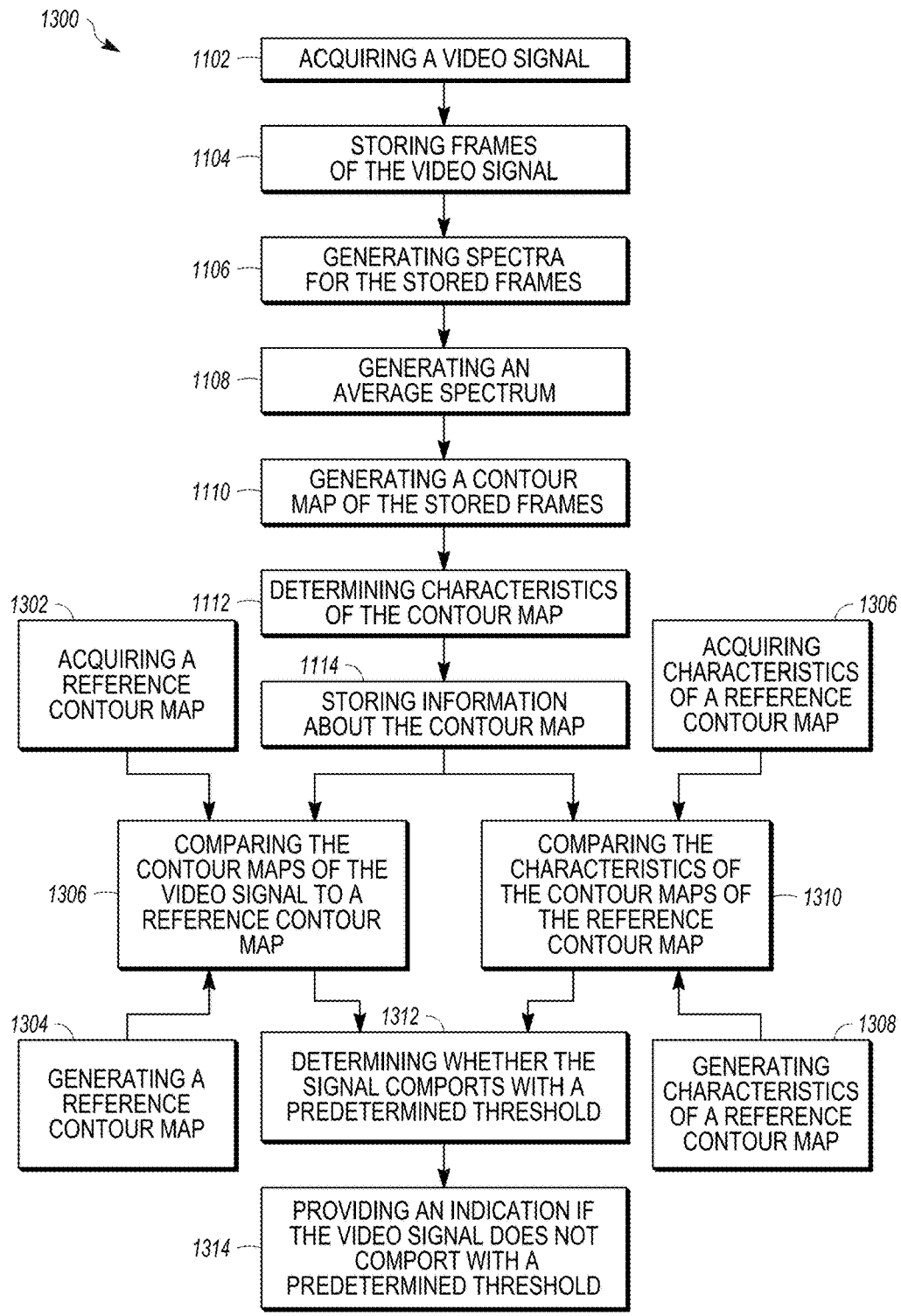
FIG. 13 depicts an embodiment of an exemplary process for determining whether a video signal comports with a desired minimal signal quality.

FIG. 13 depicts an exemplary method of determining whether an effective resolution of a signal meets a desired minimum resolution threshold. In the embodiment depicted in FIG. 13, one or more versions of a video signal is/are acquired in step 1102 and stored in step 1104. Acquisition and storage of the video signal can be performed using any known, convenient and/or desired process. In step 1106, frequency spectra can be generated for desired frames of the video signal. The frames of the video signal can be sampled at any desired frequency and the frequency spectra for the frames can be determined by any known, convenient and/or desired process. In some embodiments, the spectra can be calculated using a Fast Fourier Transform. However, in alternate embodiments any known, convenient and/or desired process can be used to determine the spectra.

In step 1108 an average spectrum is calculated based on at least a portion of the calculated spectra from step 1106. The average spectrum from step 1108 can then be used to calculate a contour map of the average spectrum in step 1110 and the characteristics of the contour map can be calculated in step 1112. Then the information regarding the characteristics of the contour map can be stored in step 1114.

In step 1306, the calculated contour map can be compared with an acquired reference contour map 1302 and/or a generated reference contour map 1304. Alternately and/or simultaneously, in step 1310 the calculated contour map characteristics can be compared with acquired reference contour map characteristics 1306 and/or generated reference contour maps characteristics 1308. Then in step 1312 it can be determined whether the signal meets the predetermined thresholds based on the reference information. In step 1314, an indication can be provided if the signal does not satisfy the predetermined threshold(s).

Figure 14:
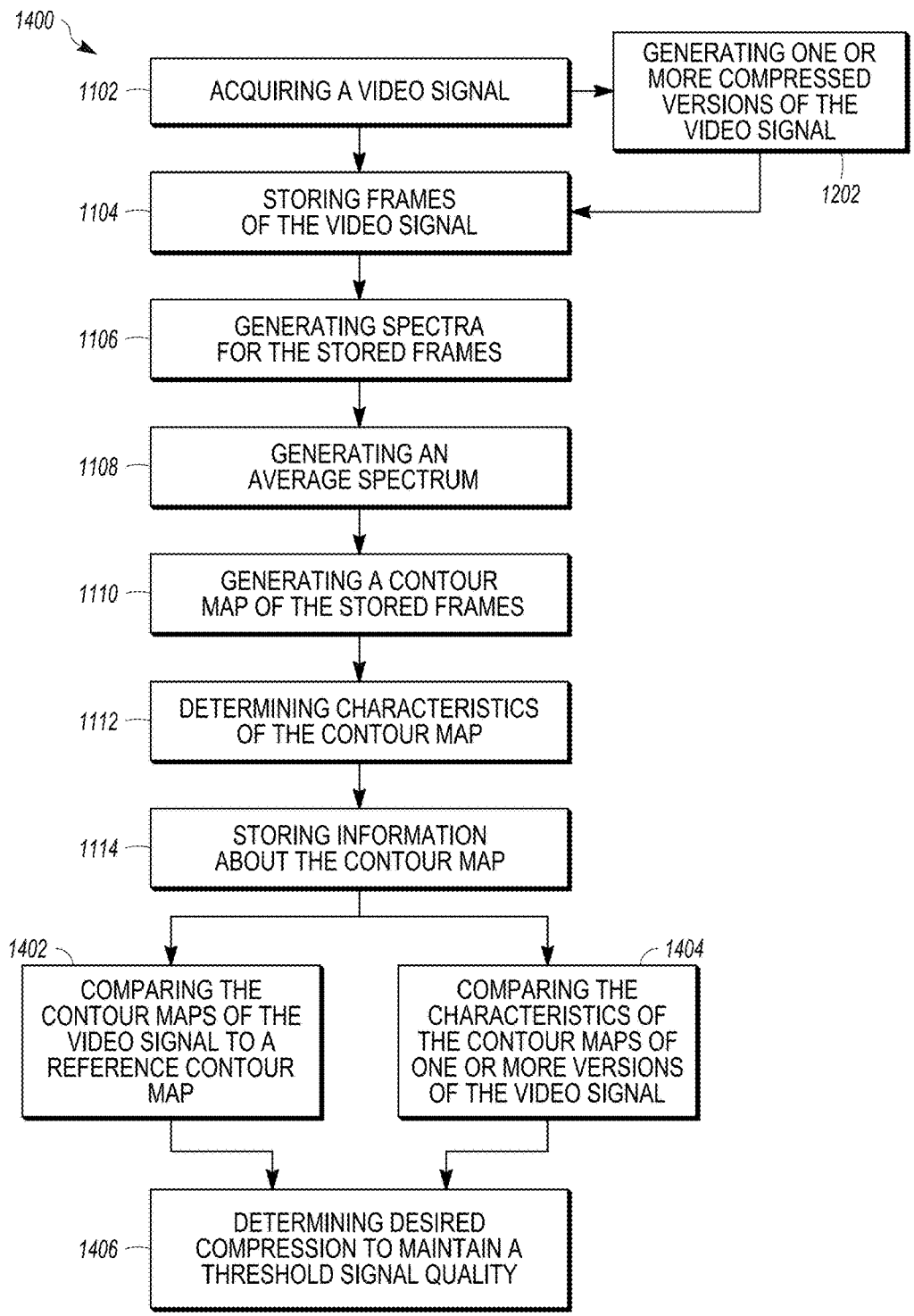
FIG. 14 depicts an embodiment of an exemplary process for determining a desired compression to maintain a minimal signal quality.

FIG. 14 depicts an embodiment of a method of determining a signal compression 1400, comprising the steps of acquiring a video signal 1102 and generating one or more versions of the video signal 1202 and storing them in step 1104.

Acquisition and storage of the video signal can be performed using any known, convenient and/or desired process. In step 1106, frequency spectra can be generated for desired frames of the video signal. The frames of the video signal can be sampled at any desired frequency and the frequency spectra for the frames can be determined by any known, convenient and/or desired process. In some embodiments, the spectra can be calculated using a Fast Fourier Transform. However, in alternate embodiments any known, convenient and/or desired process can be used to determine the spectra.

In step 1108 an average spectrum is calculated based on at least a portion of the calculated spectra from step 1106. The average spectrum from step 1108 can then be used to calculate a contour map of the average spectrum in step 1110 and the characteristics of the contour map can be calculated in step 1112. Then the information regarding the characteristics of the contour map can be stored in step 1114. Steps 1102-1114 can additionally be performed on an alternate version of the video signal. In some embodiments, the alternate version of the video signal can be the original signal that has been downscaled and then upscaled to an original format.

In step 1402, a calculated contour map can be compared with a reference contour map and in step 1406 it can be determined whether the calculated contour map meets the threshold(s) obtained from the reference contour map. Alternately and/or at the same time, reference characteristics can be compared 1404 with calculated contour map characteristics and in step 1406 it can be determined whether the calculated contour map meets the threshold(s) reference characteristics.

Figure 15:
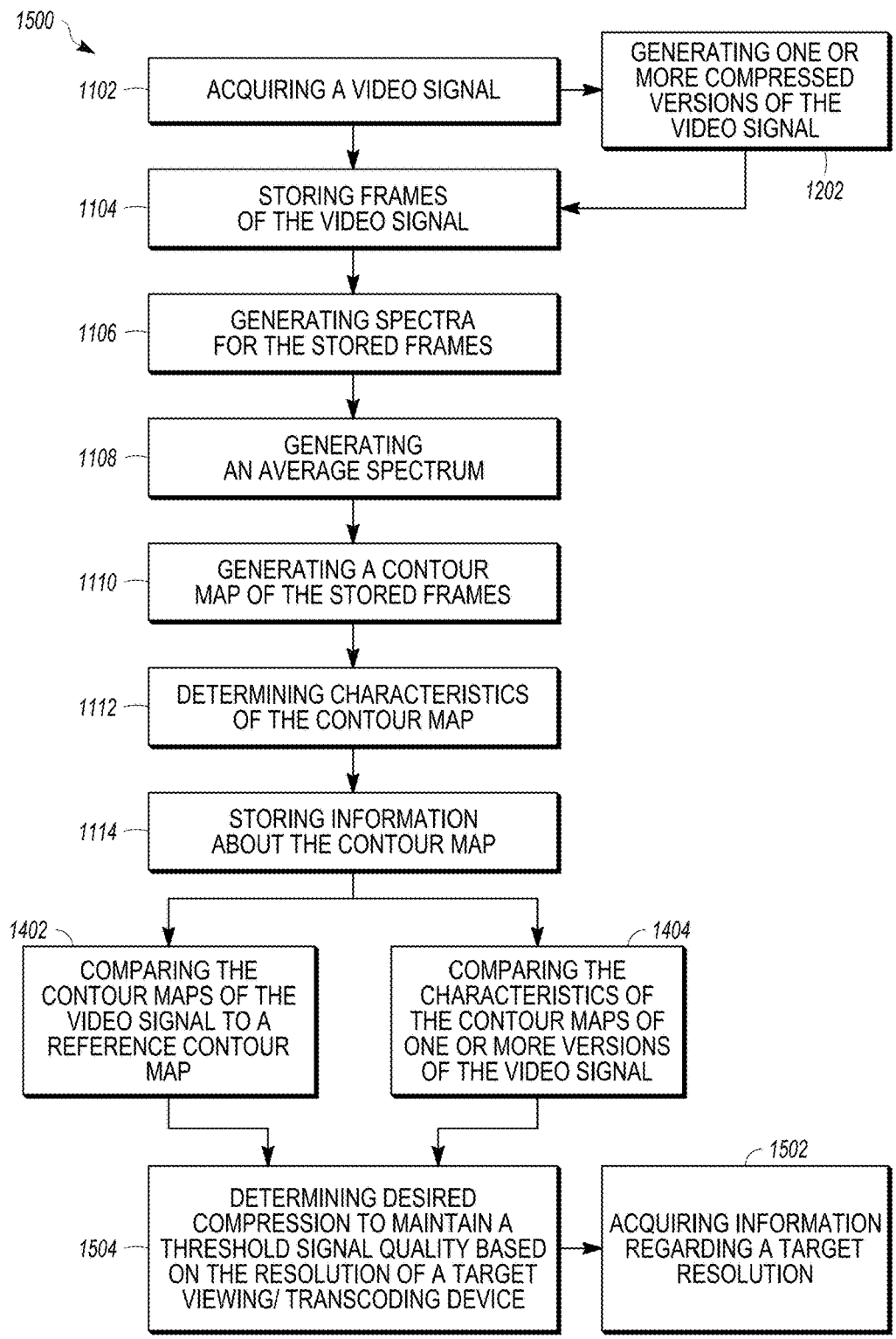
FIG. 15 depicts an embodiment of an exemplary process for determining a desired compression to maintain a minimal signal quality.

FIG. 15 depicts an embodiment of a method of determining a signal compression 1500, comprising the steps of acquiring a video signal 1102 and generating one or more versions of the video signal 1202 and storing them in step 1104.

Acquisition and storage of the video signal can be performed using any known, convenient and/or desired process. In step 1106, frequency spectra can be generated for desired frames of the video signal. The frames of the video signal can be sampled at any desired frequency and the frequency spectra for the frames can be determined by any known, convenient and/or desired process. In some embodiments, the spectra can be calculated using a Fast Fourier Transform. However, in alternate embodiments any known, convenient and/or desired process can be used to determine the spectra.

In step 1108 an average spectrum is calculated based on at least a portion of the calculated spectra from step 1106. The average spectrum from step 1108 can then be used to calculate a contour map of the average spectrum in step 1110 and the characteristics of the contour map can be calculated in step 1112. Then the information regarding the characteristics of the contour map can be stored in step 1114. Steps 1102-1114 can additionally be performed on an alternate version of the video signal. In some embodiments, the alternate version of the video signal can be the original signal that has been downscaled and then upscaled to an original format.

In step 1402, a calculated contour map can be compared with a reference contour map and/or at the same time, reference characteristics can be compared 1404 with calculated contour map characteristics.

In step 1502 a desired target resolution can be determined and in step 1504 a desired compression can be determined and/or selected based on the comparisons 1402 and/or 1404 in order to maintain a desired target resolution.

Figure 16:
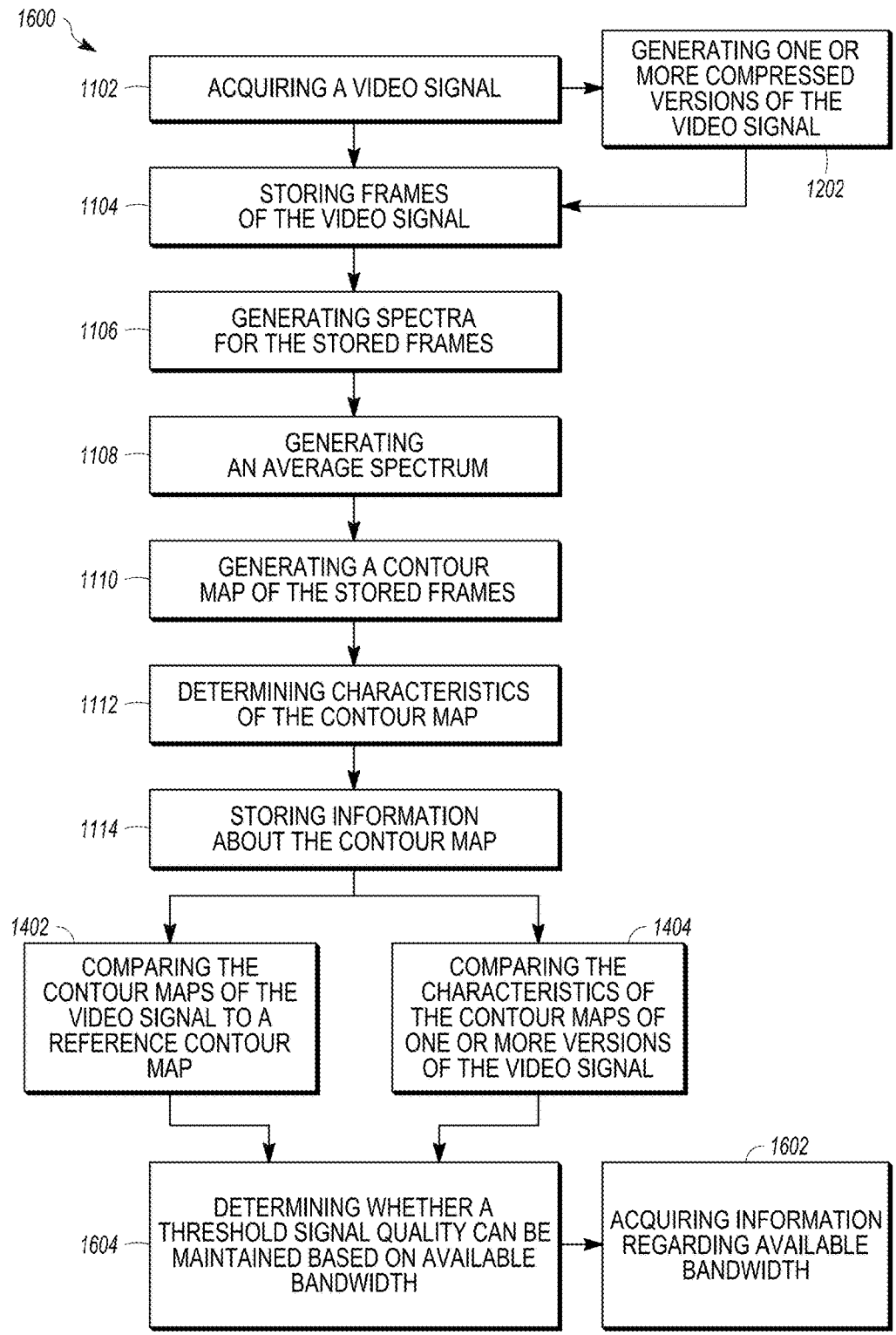
FIG. 16 depicts an embodiment of an exemplary process for determining whether a desired signal quality can be maintained based on available bandwidth.

FIG. 16 depicts an embodiment of a method of selecting a signal compression based on an available bandwidth 1600, comprising the steps of acquiring a video signal 1102 and generating one or more versions of the video signal 1202 and storing them in step 1104.

Acquisition and storage of the video signal can be performed using any known, convenient and/or desired process. In step 1106, frequency spectra can be generated for desired frames of the video signal. The frames of the video signal can be sampled at any desired frequency and the frequency spectra for the frames can be determined by any known, convenient and/or desired process. In some embodiments, the spectra can be calculated using a Fast Fourier Transform. However, in alternate embodiments any known, convenient and/or desired process can be used to determine the spectra.

In step 1108 an average spectrum is calculated based on at least a portion of the calculated spectra from step 1106. The average spectrum from step 1108 can then be used to calculate a contour map of the average spectrum in step 1110 and the characteristics of the contour map can be calculated in step 1112. Then the information regarding the characteristics of the contour map can be stored in step 1114. Steps 1102-1114 can additionally be performed on an alternate version of the video signal. In some embodiments, the alternate version of the video signal can be the original signal that has been downscaled and then upscaled to an original format.

In step 1402, a calculated contour map can be compared with a reference contour map and/or at the same time, reference characteristics can be compared 1404 with calculated contour map characteristics.

In step 1602 an available bandwidth can be acquired and based on an available bandwidth and the comparisons of step 1402 and/or step 1404 and the acquired available bandwidth determining whether a desired signal effective resolution can be maintained.

Figure 17:
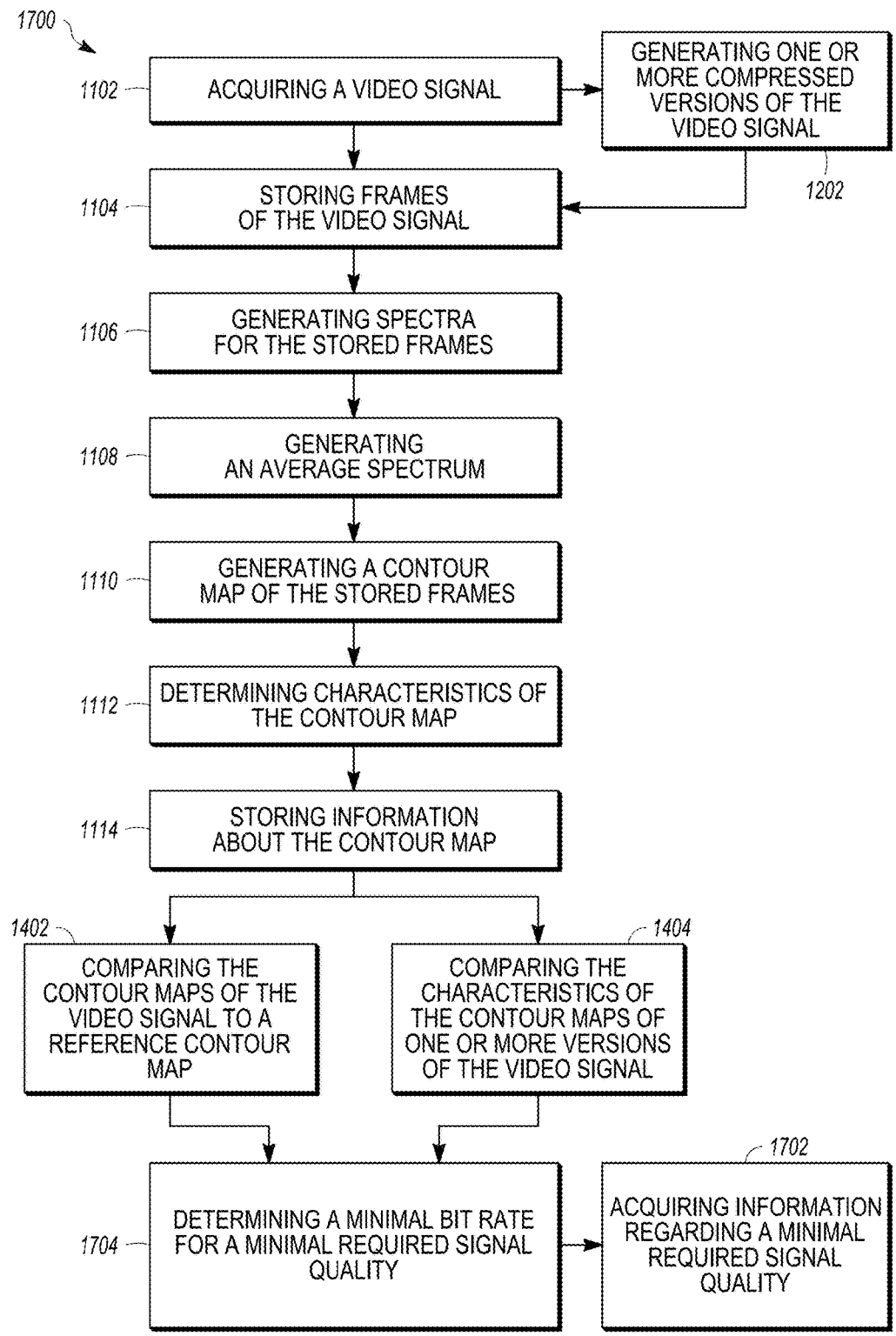
FIG. 17 depicts an embodiment of an exemplary process for determining a minimal bitrate required for a signal to maintain a desired signal quality.

FIG. 17 depicts an embodiment of a method of determining minimum bitrates to maintain minimum signal resolutions 1700, comprising the steps of acquiring a video signal 1102 and generating one or more versions of the video signal 1202 and storing them in step 1104.

Acquisition and storage of the video signal can be performed using any known, convenient and/or desired process. In step 1106, frequency spectra can be generated for desired frames of the video signal. The frames of the video signal can be sampled at any desired frequency and the frequency spectra for the frames can be determined by any known, convenient and/or desired process. In some embodiments, the spectra can be calculated using a Fast Fourier Transform. However, in alternate embodiments any known, convenient and/or desired process can be used to determine the spectra.

In step 1108 an average spectrum is calculated based on at least a portion of the calculated spectra from step 1106. The average spectrum from step 1108 can then be used to calculate a contour map of the average spectrum in step 1110 and the characteristics of the contour map can be calculated in step 1112. Then the information regarding the characteristics of the contour map can be stored in step 1114. Steps 1102-1114 can additionally be performed on an alternate version of the video signal. In some embodiments, the alternate version of the video signal can be the original signal that has been downscaled and then upscaled to an original format.

In step 1402, a calculated contour map can be compared with a reference contour map and/or at the same time, reference characteristics can be compared 1404 with calculated contour map characteristics.

In step 1702 information regarding a required minimum signal quality and/or effective resolution can be acquired. In step 1704, a minimum bitrate can be determined based upon a required minimum signal quality/effective resolution and comparison information obtained from step 1402 and/or step 1404.

Figure 18:
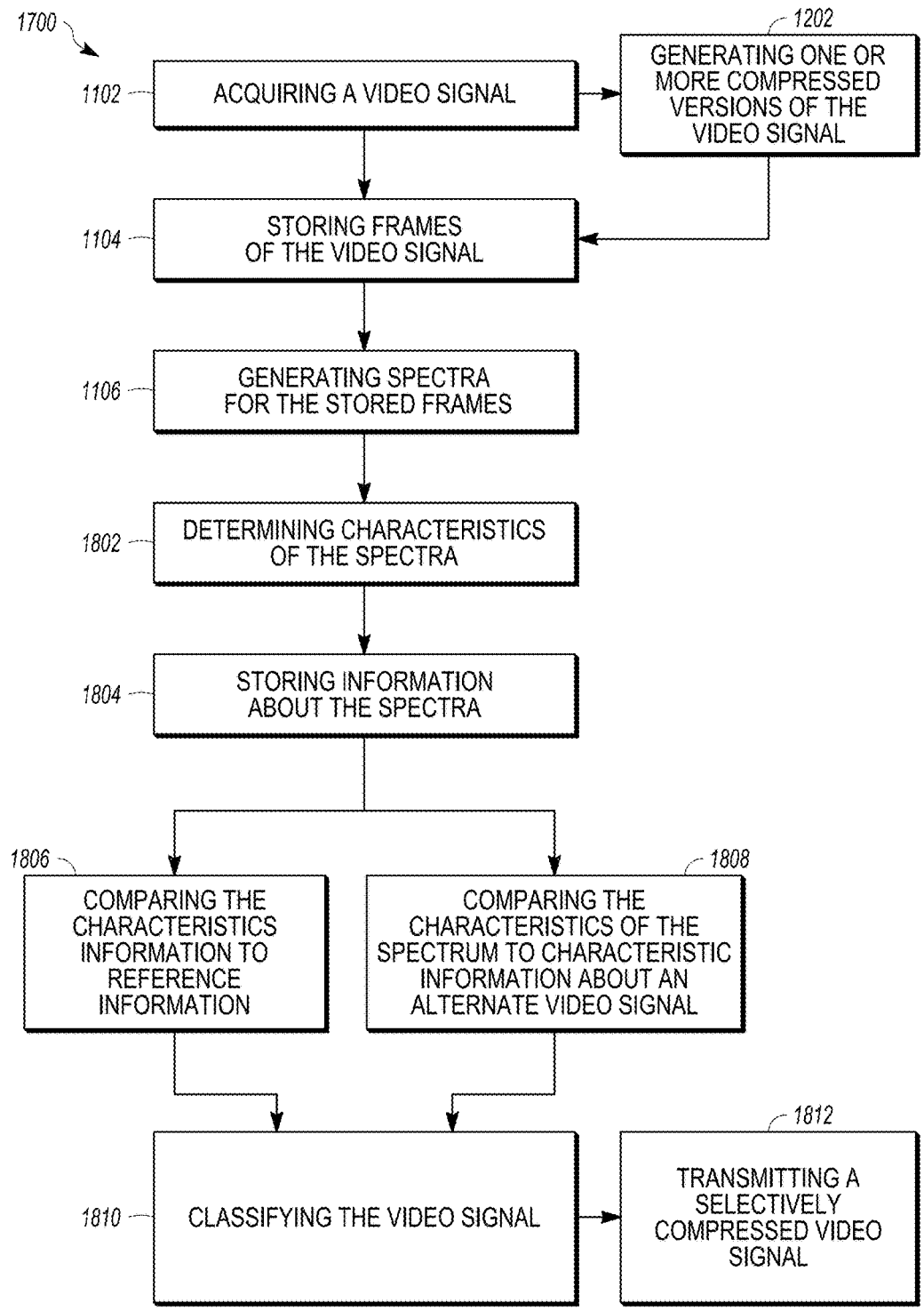
FIG. 18 depicts an embodiment of an exemplary process for classifying and signal quality and transmitting said signal.

FIG. 18 depicts an embodiment of a method of classifying a video signal 1800, comprising the steps of acquiring a video signal 1102 and generating one or more versions of the video signal 1202 and storing them in step 1104.

Acquisition and storage of the video signal can be performed using any known, convenient and/or desired process. In step 1106, frequency spectra can be generated for desired frames of the video signal. The frames of the video signal can be sampled at any desired frequency and the frequency spectra for the frames can be determined by any known, convenient and/or desired process. In some embodiments, the spectra can be calculated using a Fast Fourier Transform. However, in alternate embodiments any known, convenient and/or desired process can be used to determine the spectra.

In step 1804, characteristics of the spectra can be determined, including, but not limited to slope, correlation to adjacent frames and/or intercept and in step 1806 the characteristics can be stored.

In step 1806, one or more of the calculated characteristics can be compared with reference information and/or in step 1808, one or more of the calculated characteristics can be compared with the same characteristics calculated based on downscaled and upscaled versions of the same video signal. Based upon the comparison(s) from steps 1806 and/or 1808, a signal can be classified as being able to be compressed to a prescribed level while still meeting a threshold minimum resolution and can then be transmitted at a maximum compression 1812 such that an effective resolution will not be below a prescribed threshold.

Figure 19:
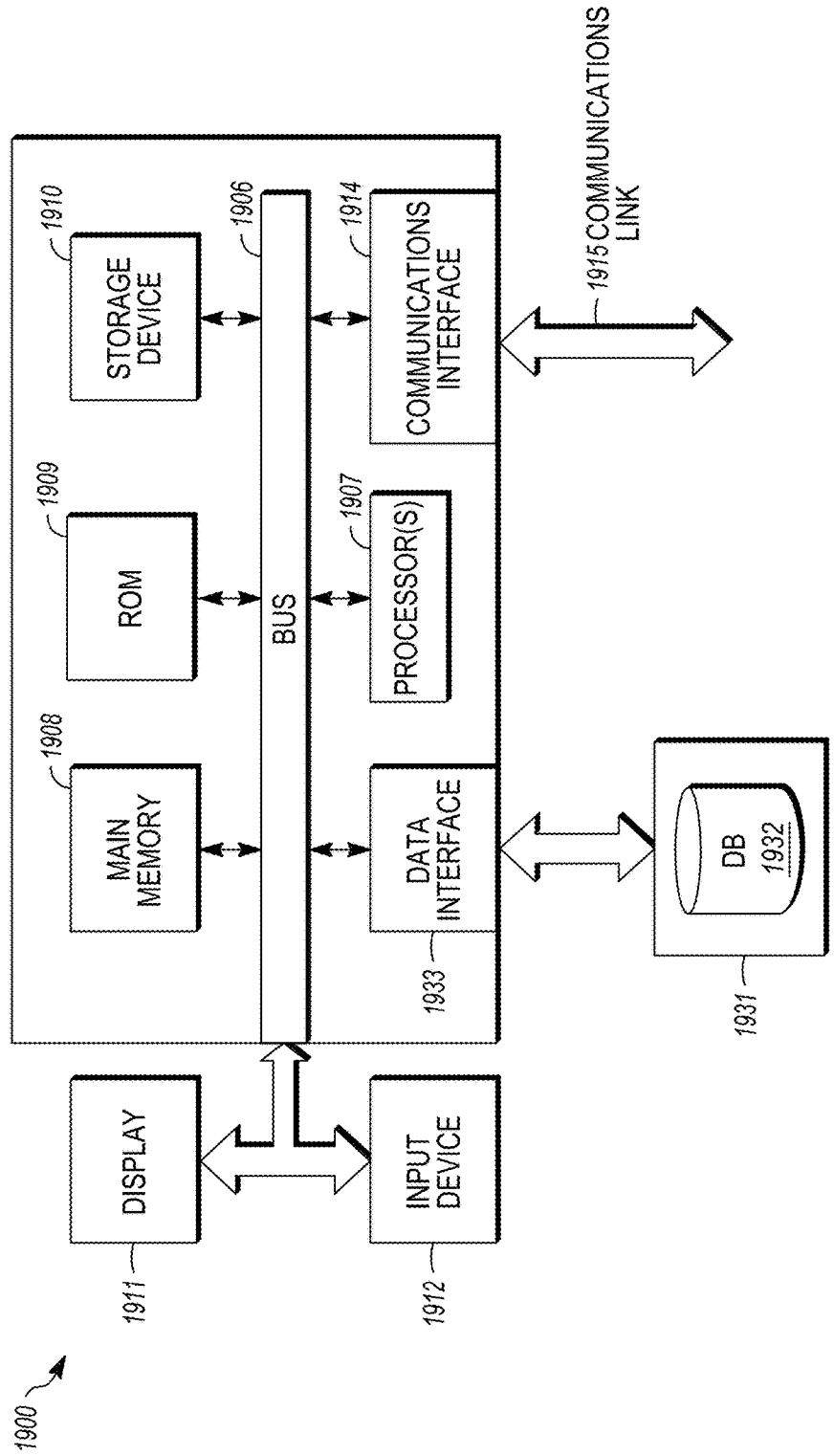
FIG. 19 depicts a block diagram of an exemplary embodiment of a computer system.

The execution of the sequences of instructions required to practice the embodiments may be performed by one or more computer systems 1900 as shown in FIG. 19. By way of non-limiting examples, the transcoding device described in step 1208, viewing devices 1208, and/or client devices can be computer systems 1900. Although a description of one computer system 1900 may be presented herein, it should be understood that any number of computer systems 1900 may be employed in communication with one another.

A computer system 1900 according to one embodiment will now be described with reference to FIG. 19, which is a block diagram of the functional components of a computer system 1900. As used herein, the term computer system 1900 is broadly used to describe any computing device that can store and independently run one or more programs.

The computer system 1900 can include a communication interface 1914 coupled to the bus 1906. The communication interface 1914 can provide two-way communication between computer systems 1900. The communication interface 1914 of a respective computer system 1900 can transmit and receive electrical, electromagnetic or optical signals that include data streams representing various types of signal information, such as instructions, messages and data. A communication link 1915 can link one computer system 1900 with another computer system 1900. For example, the communication link 1915 can be a LAN, an integrated services digital network (ISDN) card, a modem, or the Internet.

A computer system 1900 can transmit and receive messages, data, and instructions, including programs, such as applications or code, through its respective communication link 1915 and communication interface 1914. Received program code can be executed by the respective processor(s) 1907 as it is received, and/or be stored in the storage device 1910, or other associated non-volatile media, for later execution.

In some embodiments, the computer system 1900 can operate in conjunction with a data storage system 1931, such as a data storage system 1931 that contains a database 1932 that is readily accessible by the computer system 1900. The computer system 1900 can communicate with the data storage system 1931 through a data interface 1933.

A computer system 1900 can include a bus 1906 or other communication mechanism for communicating the instructions, messages and data, collectively information, and one or more processors 1907 coupled with the bus 1906 for processing information. A computer system 1900 can also include a main memory 1908, such as a random access memory (RAM) or other dynamic storage device, coupled to the bus 1906 for storing dynamic data and instructions to be executed by the processor(s) 1907. The computer system 1900 can further include a read only memory (ROM) 1909 or other static storage device coupled to the bus 1906 for storing static data and instructions for the processor(s) 1907. A storage device 1910, such as a magnetic disk or optical disk, can also be provided and be coupled to the bus 1906 for storing data and instructions for the processor(s) 1907.

A computer system 1900 can be coupled via the bus 1906 to a display device 1911, such as an LCD screen. An input device 1912, such as alphanumeric keys and/or other keys, can be coupled to the bus 1906 for communicating information and command selections to the processor(s) 1907.

According to one embodiment, an individual computer system 1900 performs specific operations by its respective processor(s) 1907 executing one or more sequences of one or more instructions contained in the main memory 1908. Such instructions can be read into the main memory 1908 from another computer-usable medium, such as the ROM 1909 or the storage device 1910. Execution of the sequences of instructions contained in the main memory 1908 can cause the processor(s) 1907 to perform the processes described herein. In alternate embodiments, hard-wired circuitry may be used in place of or in combination with software instructions. Thus, embodiments are not limited to any specific combination of hardware circuitry and/or software.

Although the present invention has been described above with particularity, this was merely to teach one of ordinary skill in the art how to make and use the invention. Many additional modifications will fall within the scope of the invention, as that scope is defined by the following claims.

What is claimed is:

1. A method for characterizing and transcoding segments of a video, comprising:
    acquiring a first picture from a video signal;
    calculating a first spatial frequency transform of the first picture;
    fitting a first line to the log magnitude of a main horizontal component of the first spatial frequency transform;
    storing at least one of a first slope, a first intercept, and a first correlation coefficient of the first line;
    acquiring a second picture from a video signal;
    calculating a second spatial frequency transform of the second picture;
    fitting a second line to the log magnitude of main horizontal component of the second spatial frequency transform;
    storing at least one of a second slope, a second intercept, and a second correlation coefficient of the second line;
    determining a first difference between at least one of the first slope and the second slope, the first intercept and the second intercept and the first correlation coefficient and the second correlation coefficient;
    determining whether the first difference exceeds a first prescribed threshold;
    signaling that the first prescribed threshold has been exceeded; and
    calculating a compression level for transcoding based upon the first prescribed threshold when the threshold first prescribed threshold has been exceeded.

2. The method of claim 1 further comprising the steps of:
    fitting a third line to the log magnitude of a main vertical component of the first spatial frequency transform;
    storing at least one of a third slope, a third intercept, and a third correlation coefficient of the third line;
    fitting a fourth line to the log magnitude of a main vertical component of the second spatial frequency transform;
    storing at least one of a fourth slope, a fourth intercept, and a fourth correlation coefficient of the fourth line;
    determining a second difference between at least one of the third slope and the fourth slope, the third intercept and the fourth intercept and the third correlation coefficient and the fourth correlation coefficient;
    determining whether the second difference exceeds a second prescribed threshold; and
    signaling that the second prescribed threshold has been exceeded.

3. The method of claim 2 wherein at least one of the first line, the second line, the third line and the fourth line is fitted using linear regression.

4. The method of claim 1 further comprising the steps of:
    comparing at least one of the first slope, the second slope, the first intercept, the second intercept, the first correlation coefficient and the second correlation coefficient to a threshold; and
    generating a segment-boundary indicator when the threshold is exceeded be a prescribed quantity.

5. The method of claim 1 further comprising the steps of:
    comparing at least one of the first slope, the second slope, the first intercept, the second intercept, the first correlation coefficient and the second correlation coefficient to a threshold; and
    generating a segment-boundary indicator when the threshold is exceeded be a prescribed percentage.

6. The method of claim 1 further comprising the steps of:
    storing the first difference;
    transmitting the difference when the difference exceeds a prescribed threshold; and
    recording the transmitted difference value.

7. The method of claim 1, wherein a compression level during transcoding transfers resolution from 4K to a lower resolution video when the threshold is exceeded.

* * * * *